US009659038B2

(12) United States Patent
Saito et al.

(10) Patent No.: US 9,659,038 B2
(45) Date of Patent: May 23, 2017

(54) EFFICIENT SNAPSHOT READ OF A DATABASE IN A DISTRIBUTED STORAGE SYSTEM

(71) Applicant: Google Inc., Mountain View, CA (US)

(72) Inventors: Yasushi Saito, Mountain View, CA (US); Sanjay Ghemawat, Mountain View, CA (US); Sebastian Kanthak, San Jose, CA (US); Christopher Cunningham Frost, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 13/909,029

(22) Filed: Jun. 3, 2013

(65) Prior Publication Data

US 2013/0339301 A1 Dec. 19, 2013

Related U.S. Application Data

(60) Provisional application No. 61/655,458, filed on Jun. 4, 2012.

(51) Int. Cl.
G06F 7/00 (2006.01)
G06F 17/00 (2006.01)
G06F 17/30 (2006.01)

(52) U.S. Cl.
CPC .. *G06F 17/30289* (2013.01); *G06F 17/30067* (2013.01); *G06F 17/30575* (2013.01)

(58) Field of Classification Search
CPC .......... G06F 2201/84; G06F 17/30067; G06F 17/30289; G06F 17/30575; G06F 11/1451; G06F 11/1435; G06F 11/1469

(Continued)

(56) References Cited

U.S. PATENT DOCUMENTS 5,333,315 A 7/1994 Saether et al.
5,421,007 A 5/1995 Coleman et al.
(Continued)

FOREIGN PATENT DOCUMENTS

CN 101001148 7/2007
CN 101316274 12/2008
(Continued)

OTHER PUBLICATIONS

Chang et al., Bigtable: A Distributed Storage System for Structured Data, Google, Nov. 2006, 14 pages, http://static.googleusercontent.com/media/research.google.com/en//archive/bigtable-osdi06.pdf.*

(Continued)

*Primary Examiner* — Dung K Chau
*Assistant Examiner* — Lin Lin Htay
(74) *Attorney, Agent, or Firm* — Morgan, Lewis & Bockius LLP

(57) ABSTRACT

A computer system issues a batch read operation to a tablet in a first replication group in a distributed database and obtains a most recent version of data items in the tablet that have a timestamp no great than a snapshot timestamp T. For each data item in the one tablet, the computer system determines whether the data item has a move-in timestamp less than or equal to the snapshot timestamp T, which is less than a move-out timestamp, and whether the data item has a creation timestamp less than the snapshot timestamp T, which is less than or equal to a deletion timestamp. If the determination is true, the computer system determines whether the move-out timestamp has an actual associated value and, if so, the computer system determines a second tablet in a second replication group in the database that includes the data item and issues the snapshot read operation to the second table in the second replication group to obtain a most-recent version of the data item that has a timestamp (Continued)

no greater than the snapshot timestamp T; otherwise, the computer system issues the snapshot read to the one tablet to obtain a most recent version of the data item that has a timestamp no greater than the snapshot timestamp T.

18 Claims, 17 Drawing Sheets

(58) Field of Classification Search
USPC .......................................................... 707/649
See application file for complete search history.

(56) References Cited

U.S. PATENT DOCUMENTS

| | | | |
|---|---|---|---|
| 5,832,521 A * | 11/1998 | Klots et al. ................... | 709/219 |
| 6,477,544 B1 | 11/2002 | Bolosky et al. | |
| 6,772,155 B1 | 8/2004 | Stegelmann | |
| 6,963,914 B1 | 11/2005 | Breitbart et al. | |
| 6,981,114 B1 * | 12/2005 | Wu ..................... | G06F 11/1469 711/112 |
| 7,334,004 B2 * | 2/2008 | Ganesh et al. | |
| 7,363,326 B2 * | 4/2008 | Margolus .......... | G06F 17/30368 380/44 |
| 7,430,570 B1 | 9/2008 | Srinivasan et al. | |
| 7,567,973 B1 | 7/2009 | Burrows et al. | |
| 7,774,469 B2 | 8/2010 | Massa et al. | |
| 8,627,135 B2 | 1/2014 | Aron et al. | |
| 8,719,432 B1 | 5/2014 | Vermeulen et al. | |
| 8,806,323 B2 | 8/2014 | Samavedula | |
| 8,838,539 B1 | 9/2014 | Ashcraft et al. | |
| 8,850,130 B1 | 9/2014 | Aron et al. | |
| 8,949,208 B1 | 2/2015 | Xu et al. | |
| 2002/0133507 A1 | 9/2002 | Holenstein et al. | |
| 2002/0178249 A1 | 11/2002 | Prabakaran et al. | |
| 2003/0065708 A1 | 4/2003 | Jacobs et al. | |
| 2003/0132855 A1 * | 7/2003 | Swan ................... | G07C 9/00111 340/8.1 |
| 2005/0015404 A1 | 1/2005 | Cherkasova | |
| 2005/0066118 A1 * | 3/2005 | Perry ................... | G06F 11/1469 711/112 |
| 2005/0149627 A1 | 7/2005 | Schreter | |
| 2005/0177590 A1 | 8/2005 | Chen et al. | |
| 2005/0192991 A1 * | 9/2005 | Nomoto .............. | G06F 11/1461 |
| 2005/0210218 A1 * | 9/2005 | Hoogterp ............. | G06F 3/0613 711/203 |
| 2006/0047895 A1 * | 3/2006 | Rowan ................ | G06F 11/0727 711/112 |
| 2007/0016546 A1 | 1/2007 | De Vorchik et al. | |
| 2007/0050429 A1 | 3/2007 | Goldring et al. | |
| 2007/0183224 A1 * | 8/2007 | Erofeev .................. | 365/189.05 |
| 2007/0219999 A1 | 9/2007 | Richey et al. | |
| 2008/0071853 A1 | 3/2008 | Mosler et al. | |
| 2008/0096662 A1 | 4/2008 | Kuwahara et al. | |
| 2008/0201366 A1 * | 8/2008 | Devarakonda .... | G06F 17/30091 |
| 2008/0243879 A1 | 10/2008 | Gokhale et al. | |
| 2008/0250072 A1 | 10/2008 | Nguyen | |
| 2008/0263305 A1 | 10/2008 | Shu et al. | |
| 2009/0070330 A1 * | 3/2009 | Hwang et al. ................... | 707/8 |
| 2009/0327642 A1 | 12/2009 | Ogihara et al. | |
| 2010/0023520 A1 * | 1/2010 | Barboy et al. ................... | 707/8 |
| 2010/0077165 A1 * | 3/2010 | Lu et al. ....................... | 711/162 |
| 2010/0281013 A1 | 11/2010 | Graefe | |
| 2011/0196664 A1 | 8/2011 | Zunger et al. | |
| 2012/0036161 A1 | 2/2012 | Lacapra et al. | |
| 2012/0151272 A1 | 6/2012 | Behrendt et al. | |
| 2012/0159102 A1 | 6/2012 | Kan | |
| 2012/0303791 A1 | 11/2012 | Calder et al. | |
| 2013/0060742 A1 | 3/2013 | Chang et al. | |
| 2013/0110774 A1 | 5/2013 | Shah et al. | |
| 2013/0204991 A1 | 8/2013 | Skjolsvold et al. | |
| 2013/0318129 A1 | 11/2013 | Vingralek et al. | |
| 2013/0346365 A1 | 12/2013 | Kan et al. | |
| 2015/0012497 A1 | 1/2015 | Clark et al. | |

FOREIGN PATENT DOCUMENTS

| | | |
|---|---|---|
| CN | 101854392 | 10/2010 |
| WO | WO 2011/100366 A2 | 8/2011 |
| WO | WO 2012/040391 A1 | 3/2012 |

OTHER PUBLICATIONS

Google Inc., International Search Report and Written Opinion, PCT/US2013/042063, Dec. 13, 2013, 16 pgs.
Google Inc., International Search Report and Written Opinion, PCT/US2013/044105, Nov. 14, 2013, 6 pgs.
Google Inc., International Preliminary Report on Patentability, PCT/US2013/044105, Dec. 9, 2014, 4 pgs.
Google Inc., International Preliminary Report on Patentability, PCT/US2013/044163, Dec. 9, 2014, 9 pgs.
Bernstein, Chapter 5—Multiversion Concurrency Control, Concurrency Control and Recovery in Database Systems, Jan. 1, 1987, 24 pgs.
Elmasri, Chapter 20—Physical Database Design and Tuning, Fundamentals of Database Systems, 6th Ed., Addison-Wesley, Jan. 1, 2011, 16 pgs.
Garcia-Molina, Chapter 18—Concurrency Control, Database Systems: The Complete Book, Prentice-Hall, Jan. 1, 2002, 72 pgs.
Garcia-Molina, Chapter 1—The Worlds of Database Systems, Database Systems: The Complete Book, Prentice Hall, Jan. 1, 2002, 21 pgs.
Google Inc., International Search Report and Written Opinion, PCT/US2013/044163, May 9, 2014, 11 pgs.
Zhang, Supporting Multi-Row Distributed Transactions with Global Snapshot Isolation Using Bare-Bones Hbase, 11th IEEE/ACM Int'l Conf. on Grid Computing, Piscataway, NJ, Oct. 25, 2010, pp. 177-184.
Ghemawat, The Google File System, Proc. of the ACM Symposium on Operating Systems Principles, Oct. 19, 2003, pp. 1-15.
Ivanova, Self-Organizing Strategies for a Column-Store Database, Proc. of the 11th International Conference on Extending Database Technology Advances in Database Technology, EDBT'08, Mar. 25, 2008, pp. 157-168.
Google Inc., Invitation to Pay Additional Fees, PCT/US2013/042063, Jul. 30, 2013, 6 pgs.
Chang, Bigtable: A Distributed Storage System for Structured Data, Google, Nov. 2006, 14 pgs, research.google.com/archive/bigtable.html.
Notification of First Office Action CN 201380037792.3, Sep. 28, 2016, 11 pgs.

* cited by examiner

EFFICIENT SNAPSHOT READ OF A DATABASE IN A DISTRIBUTED STORAGE SYSTEM

RELATED APPLICATIONS

This application claims priority to U.S. Provisional Application No. 61/655,458, filed Jun. 4, 2012, entitled "Efficient Snapshot Read of a Database In A Distributed Storage System," which is incorporated by reference herein in its entirety.

This application is related to U.S. application Ser. No. 13/898,411, filed May 20, 2013, entitled "Organizing Data in a Distributed Storage System," which application is incorporated by reference herein in its entirety.

TECHNICAL FIELD

The disclosed implementations relate generally to the management of a distributed storage system, and in particular, to system and method for organizing a large volume of data in a distributed storage system.

BACKGROUND

The Internet has become a popular venue for people across the globe for storing and exchanging information. As the amount of data managed by the Internet rapidly increases, both individually and collectively, and the service associated with the data gets more complicated, it is becoming a constant challenge for an Internet-based service provider to manage such a large volume of data and render the associated service efficiently in response to different data access requests by users from anywhere in the world.

SUMMARY

In accordance with some embodiments, a method for performing a snapshot read operation in a distributed database is performed at a computer system having a plurality of processors and memory storing programs for execution by the processors. The computer system receives a data access request from another computer system. In response to the data access request, the computer system issues a batch read operation to one tablet in a first replication group in the database to obtain a most recent version of data items in the one tablet that have a timestamp no great than a snapshot timestamp T. For each of a plurality of data items in the one tablet, the computer system obtains a state of the data item, identifies a tablet to issue the snapshot read operation to the identified tablet to obtain a most recent version of the data item by comparing the state of the data item with the snapshot timestamp T, and provides the most recent version of the data item to the requesting computer system.

In accordance with some embodiments, a computer system comprises a plurality of processors and memory storing programs for execution by the processors, the programs including instructions for: receiving a data access request from another computer system; in response to the data access request, issuing a batch read operation to one tablet in a first replication group in the database to obtain a most recent version of data items in the one tablet that have a timestamp no great than a snapshot timestamp T; for each of a plurality of data items in the one tablet, obtaining a state of the data item; identifying a tablet to issue the snapshot read operation to the identified tablet to obtain a most recent version of the data item by comparing the state of the data item with the snapshot timestamp T; and providing the most recent version of the data item to the requesting computer system.

In accordance with some embodiments, a non-transitory computer readable medium stores one or more programs for execution by one or more processors of a computer system, the one or more programs including instructions: receiving a data access request from another computer system; in response to the data access request, issuing a batch read operation to one tablet in a first replication group in the database to obtain a most recent version of data items in the one tablet that have a timestamp no great than a snapshot timestamp T; for each of a plurality of data items in the one tablet, obtaining a state of the data item; identifying a tablet to issue the snapshot read operation to the identified tablet to obtain a most recent version of the data item by comparing the state of the data item with the snapshot timestamp T; and providing the most recent version of the data item to the requesting computer system.

BRIEF DESCRIPTION OF DRAWINGS

The embodiments disclosed herein are illustrated by way of example, and not by way of limitation, in the figures of the accompanying drawings. Like reference numerals refer to corresponding parts throughout the drawings.

DETAILED DESCRIPTION

Figure 1A:
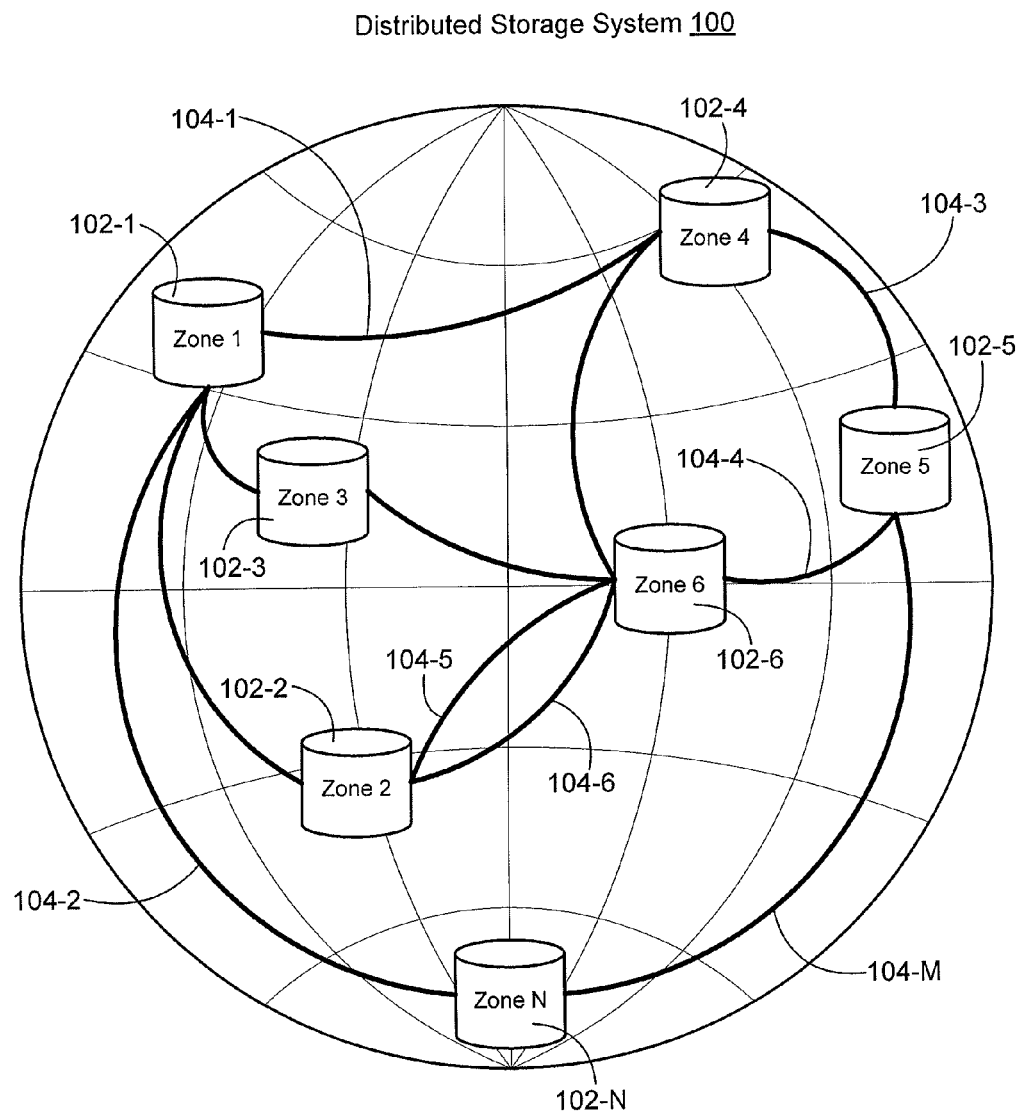
FIGS. 1A through 1F are block diagrams, each illustrating certain aspects of a distributed storage system in accordance with some embodiments.

FIGS. 1A through 1F are block diagrams, each illustrating certain aspects of a distributed storage system in accordance with some embodiments. In particular, FIG. 1A depicts a distributed storage system 100 according to some implementations of the present application. The distributed storage system 100 includes a plurality of zones 102-1, 102-2, . . . 102-N at various locations across the world, connected by network communication links 104-1, 104-2, . . . 104-M. In some embodiments, a zone (such as the zone 1 102-1) corresponds to one or more data centers that are geographically close to each other. For example, the North American region may include a zone that has two data centers located in New York City (e.g., in adjacent buildings, in buildings several miles apart, etc.) and another zone that has two data centers located in Washington D.C. Note that other zones in other geographic locations within North America may be present in the North American region. Although the conceptual diagram of FIG. 1A shows a limited number of network communication links 104-1, etc., typical embodiments would have many more network communication links. In some embodiments, there are two or more network communication links between the same pair of zones, as illustrated by links 104-5 and 104-6 between the zone 2 (102-2) and the zone 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, each zone maintains the statistic information about the transfer of data across one or more of the network communication links within the distributed storage system 100, including throughput rate, times of availability, reliability of the links, etc.

Figure 1B:
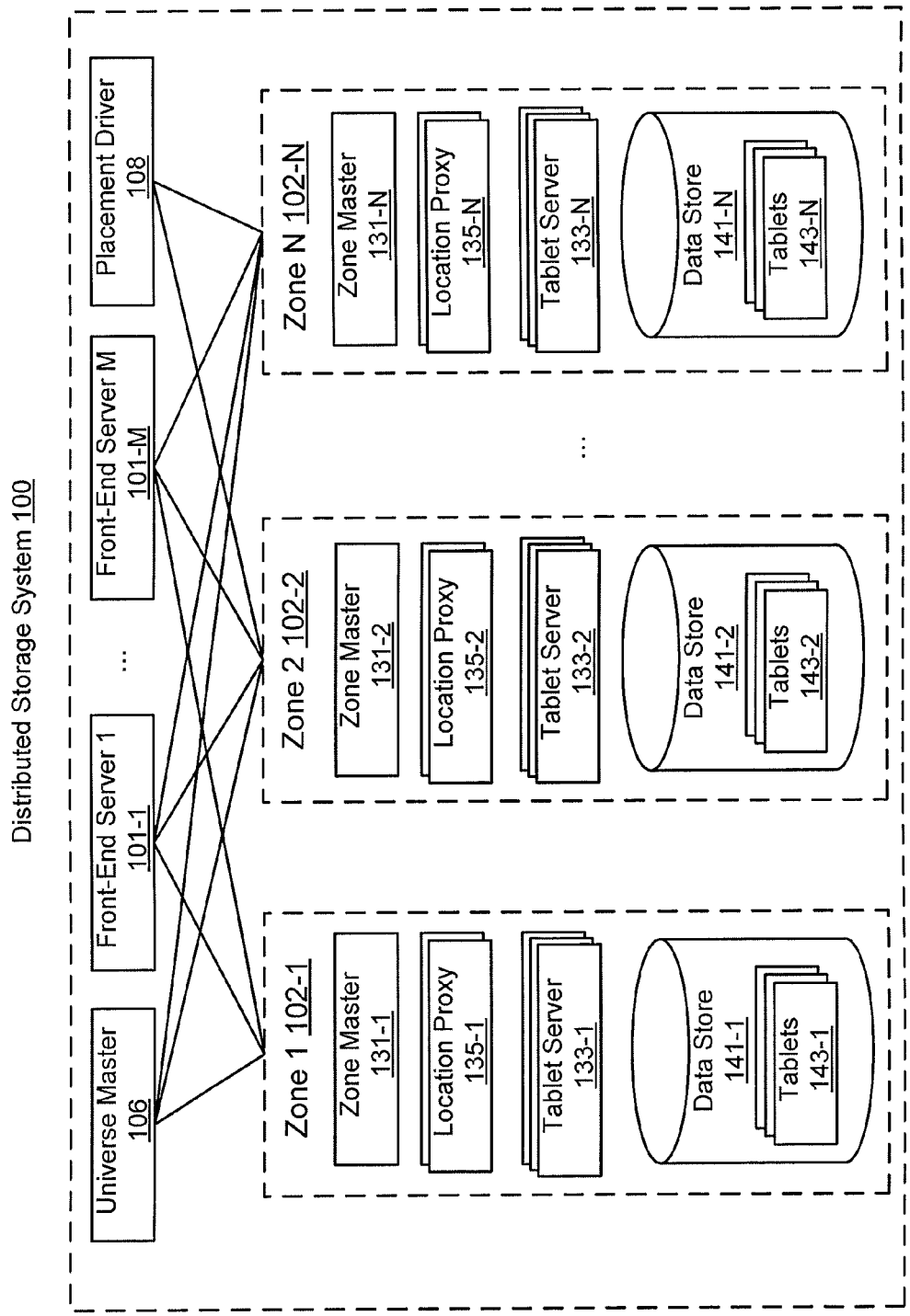

FIG. 1B depicts the components of the distributed storage system 100 according to some implementations of the present application. The distributed storage system 100 includes a universe master 106, one or more front-end servers (101-1, . . . , 101-M), a placement driver 108, and a plurality of zones (102-1, 102-2, . . . , 102-N). The universe master 106 and the placement driver 108 are responsible for monitoring the performance of the system 100 and controlling the data replication/migration between two zones. A zone (102-1, 102-2, . . . , 102-N) typically includes a data store (141-1, 141-2, . . . , 141-N) hosting a plurality of tablets (143-1, 143-2, . . . , 143-N), and utilizes a cluster of computer servers, including a zone master (131-1, 131-2, . . . , 131-N), one or more location proxies (135-1, 135-2, . . . , 135-N), one or more tablet servers (133-1, 133-2, . . . , 133-N) to perform all of the tablet-related tasks. The data store (141-1, 141-2, . . . , 141-N) provides the underlying persistent storage space for data managed by a corresponding zone (102-1, 102-2, . . . , 102-N). In some embodiments, data within the data store (141-1, 141-2, . . . , 141-N) are organized into many tablets, which is a basic data unit handled within a particular zone. The zone master (131-1, 131-2, . . . , 131-N) is responsible for assigning each tablet in the data store (141-1, 141-2, . . . , 141-N) to one of the tablet servers (133-1, 133-2, . . . , 133-N) for handling read/write requests directed at the tablet based, at least in part, on the CPU and memory usage at the tablet servers. For example, when the zone master determines that one tablet server is overloaded, it may orchestrate the migration of some tablets from this overloaded tablet server to other tablet servers in the same zone or maybe even another zone. A location proxy provides a location-lookup service to another entity (e.g., a front-end server or a tablet server) such that, for a given tablet, the location proxy identifies a respective tablet server that has been chosen for handling the read and write requests directed at the tablet.

Figure 1C:
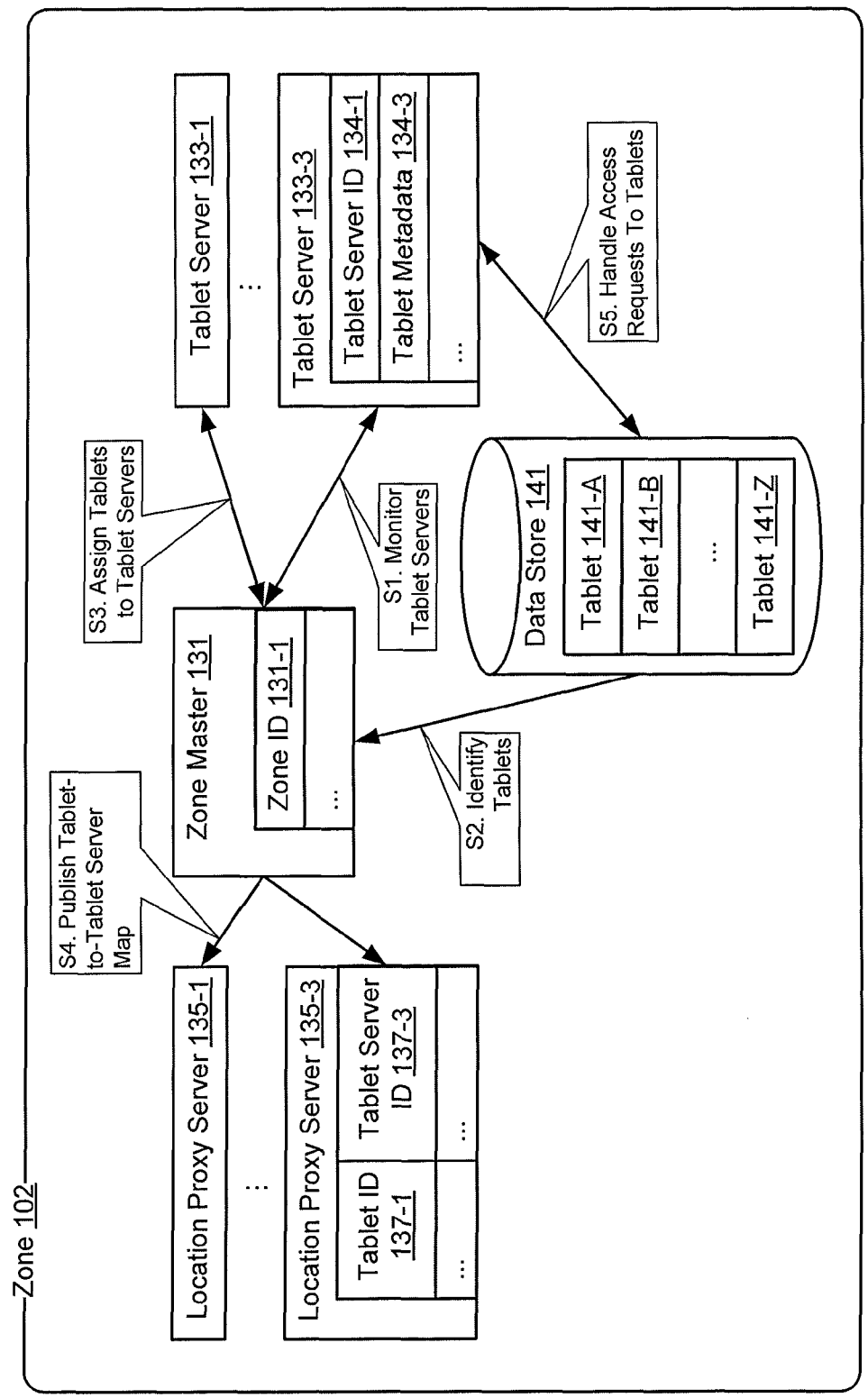

FIG. 1C illustrates in more detail how different components within a zone coordinate with each other to perform various tablet-related tasks according to some implementations of the present application. In this example, the zone 102 includes a zone master 131, a plurality of tablet servers (133-1, 133-3), a plurality of location proxy servers (135-1, 135-3), and a data store 141 that includes multiple tablets (141-A, 141-B, . . . , 141-Z). The zone master 131 has a zone ID 131-1 that uniquely identifies the zone 102 among a plurality of zones in a distributed storage system as shown in FIG. 1B. As will be described below in connection with FIG. 1D, the zone ID is used by a front-end server 101 for determining which zone includes the client-requested data. As described above, the location proxy servers (135-1, 135-3) provide a location-lookup service to other entities. In some embodiments, a location proxy server uses a lookup table to support the location-lookup service. FIG. 1C depicts an exemplary lookup table, each row of the table including a tablet ID 137-1 and a tablet server ID 137-3. In response to a tablet ID provided by another entity, the location proxy server returns a tablet server ID to the requesting entity, which identifies a tablet server that is chosen by the zone master 131 for managing the corresponding tablet associated with the tablet ID. Accordingly, the requesting entity can communicate with the identified tablet server with respect to tasks associated with the tablet. A tablet server 133-3 is identified by a tablet server ID 134-1 and further includes tablet metadata 134-3 associated with the tablets managed by the tablet server 133-3. For example, the tablet metadata 134-3 includes the tablet IDs of the tablets managed by the tablet server 133-3. In some embodiments, the tablet metadata 134-3 also includes information about the splits associated with the tablet. A more detailed description of the relationship between a split and a tablet is provided below in connection with FIG. 1D.

In some embodiments, the zone master 131 monitors the performance of the tablet servers (133-1, 133-3) by periodically (e.g., after every 10 seconds) communicating with the tablet servers (133-1, 133-3). A tablet server reports to the zone master 131 its current status information, including its CPU and memory usage, etc., as well as other information used for determining the association between a set of tablets and the tablet server. Based on such information, the zone master 131 determines whether or not to assign a tablet in the data store 141 to a corresponding tablet server. For example, the zone master 131 may identify some tablets associated with one tablet server 133-3, which is deemed to be overloaded, and assign the identified tablets to another tablet server 133-1. In addition, the zone master 131 publishes the updated tablet-to-tablet server map through the location proxy servers (135-1, 135-3). When another entity (e.g., a front-end server or a tablet server) wants to learn which tablet server is responsible for managing a particular tablet, the entity can query one of the location proxy servers by providing a tablet ID and receiving a corresponding tablet server ID associated with the tablet ID. After identifying a tablet server for a particular tablet through the location-lookup service, the entity can communicate with the identified tablet server for any read/write access requests directed at the tablet.

Figure 1D:
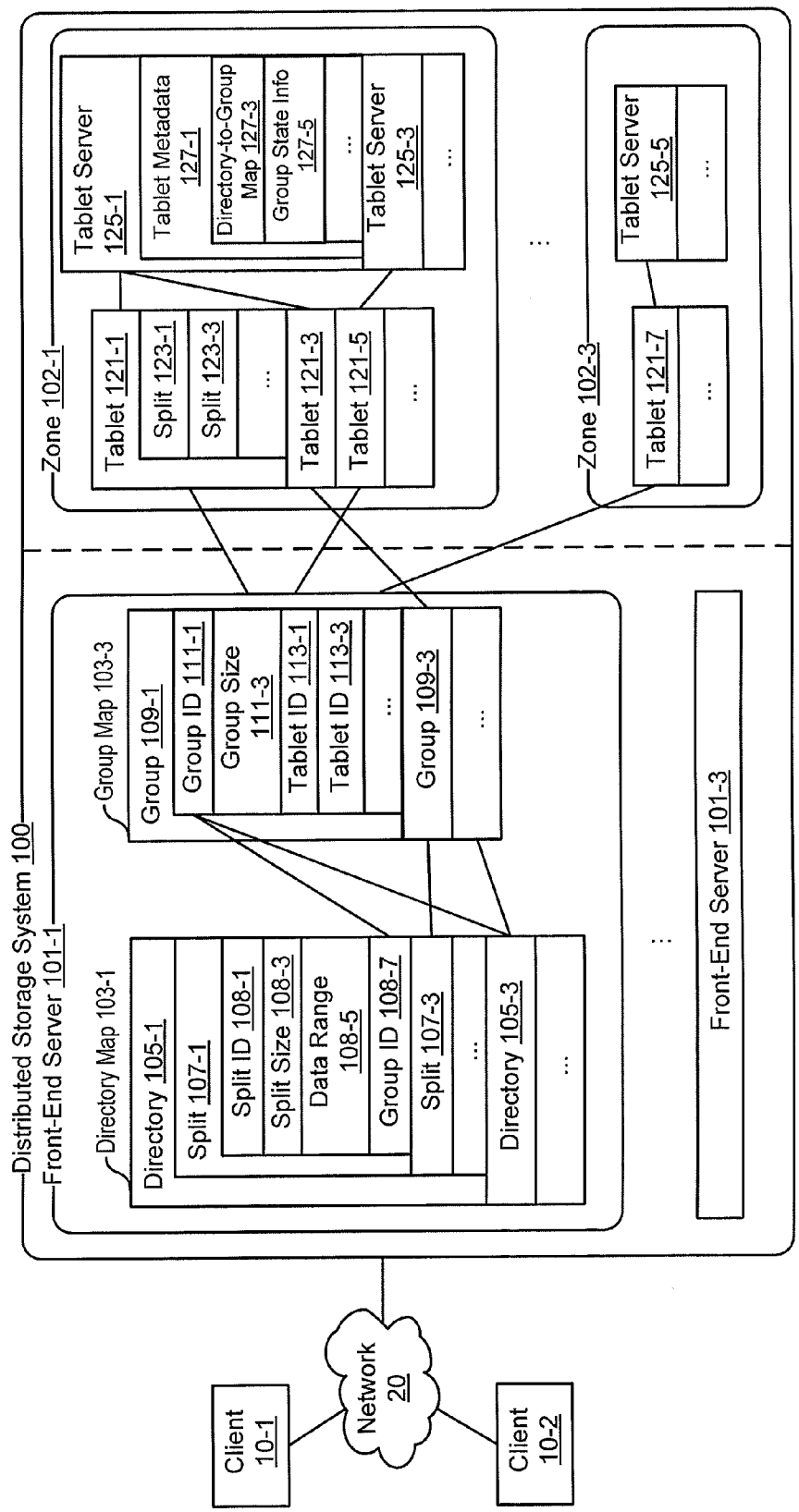

FIG. 1D illustrates how different components within the distributed storage system 100 interact with each other to satisfy data access requests from different clients according to some implementations of the present application. In this example, the clients (10-1, 10-2) are connected to the distributed storage system 100 via a network 20 (e.g., Internet) and they send requests for accessing data hosted by the distributed storage system 100. In this application, the term "client" may refer to a client computer (e.g., a desktop/laptop computer or a mobile device such as a tablet computer or a smartphone) from which an end user initiates a request for accessing a piece of data managed by the distributed storage system 100. Alternatively, the term "client" may refer to a computer server that provides on-line services (e.g., email or advertising) to multiple users and uses the distributed storage system 100 for hosting data associated with the on-line services. In either case, the distributed storage system 100 is responsible for identifying and returning the client-requested data to the requesting clients upon receipt of such requests from the clients. For illustrative purposes, it is assumed that one of the clients is an on-line advertising service provider and the distributed storage system 100 hosts data associated with different customers of the on-line advertising service provider.

When the client wants to access data associated with a customer, it submits a data access request to a front-end server 101. In some embodiments, different front-end servers (shown in FIG. 1C) are responsible for providing data-related services to different clients. For example, some of the front-end servers are configured for handling data access requests from clients for access email service data and some other front-end servers are configured for handling data access requests from clients for access advertising service data. In some embodiments, data associated with an online service application is further partitioned into multiple portions and each front-end server is configured for handling a subset of the data access requests for one or more portions of the data. In some embodiments, the front-end servers of the distributed storage system are located at different geographical locations to provide services to nearby clients that submit data access requests associated with different online services. As shown in FIG. 1D, a client submits a data access request by invoking an application programming interface (API) accepted by the front-end server 101. The data access request includes identification information of the one or more customers. In some embodiments, the data associated with a customer corresponds to a row in a data table and the row of customer data is further divided into multiple columns. The data access request may include a row identifier and possibly one or more column identifiers if the client is interested in accessing data in the one or more columns associated with each customer. Upon receipt of the data access request, the front-end server 101 needs to determine where the client-requested data is located in the distributed storage system 100 such as information about the zone and tablet(s) that have the client-requested data.

As shown in FIG. 1D, different components in the distributed storage system 100 are organized into two domains based on their respective roles: (i) the logical domain including the front-end servers (101-1, 101-3) and (ii) the physical domain including the zones (102-1, 102-3). The front-end servers handle data access requests from the external clients and use data structures such as the directory map 103-1 and the group map 103-3 to free the clients from understanding how data is physically stored in the distributed storage system 100. In some embodiments, each customer of the on-line advertising service is associated with one directory in the directory map 103-1. Based on the logical directory identifier provided by a client, the front-end server 101-1 identifies a particular entry in the directory map 103-1, which corresponds to the particular customer.

To improve the scalability of the distributed storage system 100, data associated with a customer is divided into multiple segments, which are referred to as "splits", each split having a unique split ID in the directory map 103. As shown in FIG. 1D, each directory (e.g., directory 105-1) includes one or more splits (107-1 and 107-3). The number of splits associated with a directory is determined by the size of data associated with a corresponding customer. The more data the customer has, the more splits the data may be divided into. When the size of data within a split reaches a predefined threshold, no more data is added to the split and a new split is generated for hosting new data associated with the account. In some embodiments, there is no limit on the size of data for an account. In other embodiments, the size of data for an account is set to a predetermined limit. The predetermined limit may be determined by the distributed storage system 100 (e.g., a global limit of the size of data that is applied to all accounts), the application for which the data for the account is associated (e.g., a web mail application may impose a limit of the size of data for its accounts that are different than an advertisement application), and/or may be increased if an end user purchases more storage space for an account. Note that the client (i.e., the on-line advertising service provider) does not need to know which split(s) has the client-requested data. Instead, the client specifies the requested data in a request using a format defined by the client-associated online service provider and the front-end server 101-1 translates the client request into a set of split IDs that identify the splits including the client-requested data.

To improve the reliability and efficiency of the distributed storage system 100, data associated with a customer is replicated into multiple copies and stored in different tablets of one or more zones. In other words, the basic data unit for a particular customer in a front-end server is a split and the basic data unit in a zone is a tablet. As shown in FIG. 1D, a group in the group map 103-2 is defined to associate a split in the directory map 103-1 with a plurality of tablets in a particular zone. In this example, the split 107-1 is a data structure associating the split ID 108-1 with a group ID 108-7, which corresponds to an entry 109-1 in the group map 103-3. The split 107-1 also includes a split size 108-3 indicating the actual amount of data currently within this split and a data range indicator 108-5. As will be described below, the data range indicator is used for indicating whether the split has space for more data or not. When the split runs out of space, a new split (e.g., split 107-3) will be created for hosting new data associated with the account. In this example, the split 107-3 is associated with the group 109-3, not the group 109-1. Note that different splits associated with an account may belong to the same group of splits or different groups of splits. Each group includes a plurality (e.g., hundreds or even thousands) of splits associated with different accounts and has a predefined group limit The exact association between a split and a group is dynamically determined based, in part, on the remaining capacity of a particular group. In some embodiments, the front-end server tries to add different splits associated with the same account to the same group because these splits are likely to be accessed by a client at the same time and it is probably more convenient for them to be within the same group and therefore the same set of tablets, which are replicas of the group. If the group (e.g., group 109-1) runs out of space, the front-end server may identify another group (e.g., group 109-3) for the split 107-3. In some embodiments, the data replication policy is defined for each account, the group 109-3 is chosen for the split 107-3 because it has the same number of tablets as the group 109-1. In other words, splits associated with different accounts that have different data replication policies should be added to different groups with different numbers of tablets.

In accordance with a data replication policy provided by the client, a predefined number of instances of the group are generated in the distributed storage system 100, each instance of the group being referred to as a tablet. As shown in FIG. 1D, the group 109-1 has a group ID 111-1 (which is the same as the group ID 108-7 in the split 107-1), a group size 111-3, and a list of tablet IDs (e.g., tablet IDs 113-1, 113-3) of the group. Splits associated with different directories (e.g., directory 105-1 and directory 105-3) both belong to the group 109-1, suggesting that the two accounts corresponding to the two directories have the same data replication policy. In response to a client request, the front-end server 101-1 first identifies one or more split IDs in the directory map 103-1, which are associated with a customer identified by the client request, and then identifies a group and an associated list of tablet IDs for each split ID. FIG. 1D depict an embodiment in which different splits (as identified by the split IDs 107-1 and 107-3) associated with one customer are assigned to different groups (the group 109-1 and the group 109-3). This situation happens when the size of a group reaches a predefined group limit such that it is less efficient to keep all the data associated with one customer (e.g., multiple splits) in one group and therefore one tablet.

After the front-end server 101-1 identifies the tablet IDs in a group of splits that includes the client-requested data, the process of accessing the client-requested data is shifted from the logical domain to the physical domain, i.e., a zone that includes the tablets associated with the identified tablet IDs. In some embodiments, a tablet ID (113-1 or 113-3) includes a respective zone ID embedded therein. Therefore, after identifying the tablet IDs, the front-end server 101-1 also knows which zone has the client-requested data. As noted above, each zone includes one or more location proxy servers that provide the location-look up service for identifying a particular tablet server for each tablet. Based on the zone ID included in a tablet ID, the front-end server 101-1 submits a query to a respective location proxy server at a particular zone identified by the zone ID, the query including one or more tablet IDs (113-1, 113-3). The location proxy server then returns one or more tablet server IDs, each tablet server ID identifying a respective tablet server (e.g., the tablet server 125-1 or the tablet server 125-3) that has been chosen by the zone master for managing the data access requests to the particular tablet. Upon receipt of the one or more tablet server IDs, the front-end sever 101-1 submits a request to a corresponding tablet server, the request including identification of one or more splits (e.g., splits 123-1 and 123-3) within the tablet (e.g., the tablet 121-1). In response to the request, each tablet server identifies a corresponding tablet in the data store and performs the operations to the identified tablet accordingly.

Figure 1E:
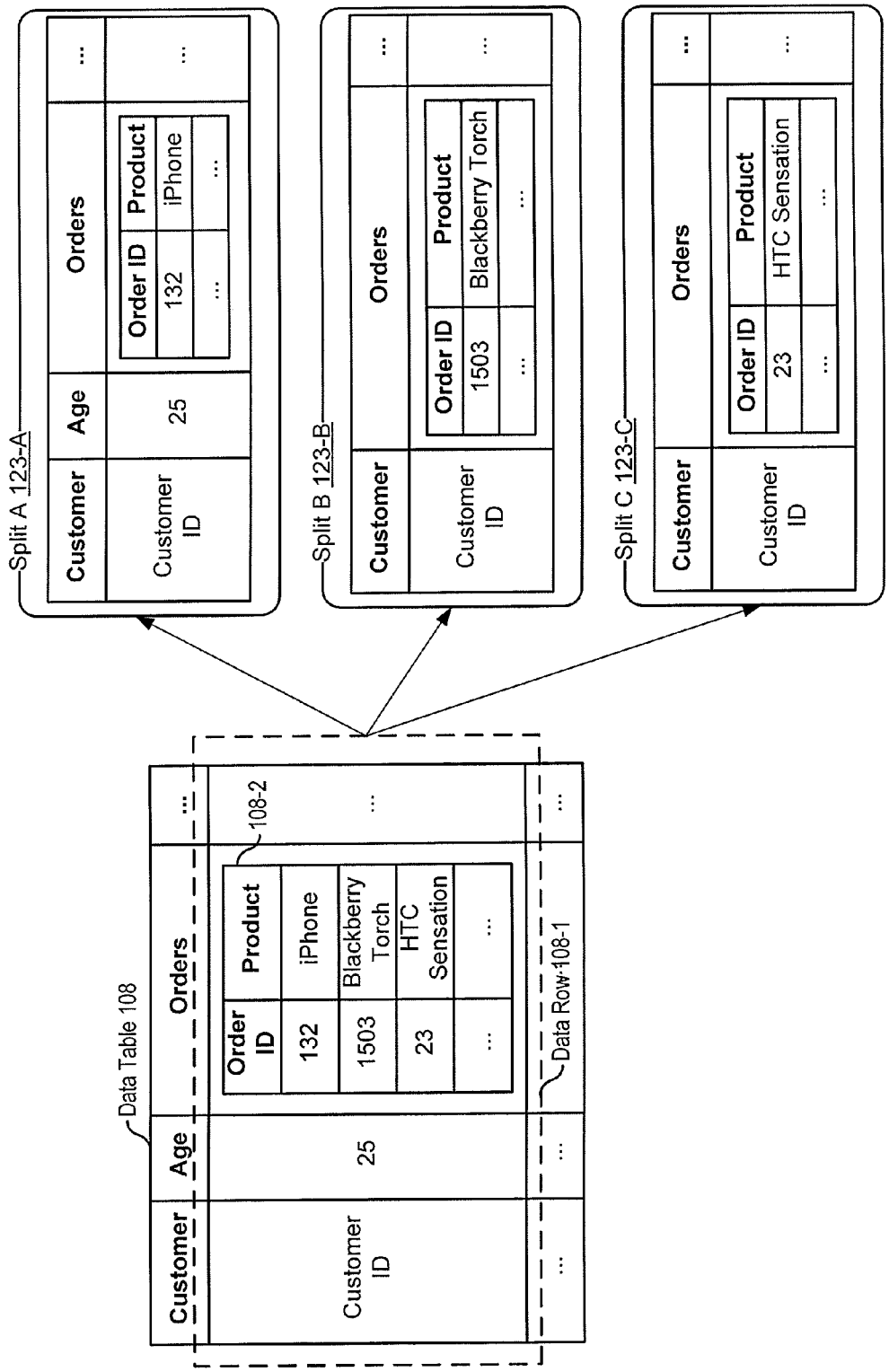

FIG. 1E illustrates how the customer data of an on-line advertising service is divided into multiple splits according to some embodiments of the present application. The data table 108 illustrates how the customer data is stored in a table-like data structure. As shown in the figure, each row 108-1 in the data table 108 represents the data associated with a particular customer whose customer ID is a primary key of the data row. The data row 108-1 includes multiple columns. Some columns such as the "Customer" column and the "Age" column each have one attribute value whereas some other columns include an embedded data structure (e.g., the embedded table 108-2). As shown in the figure, the data row 108-1 is divided into multiple splits (123-A, 123-B, 123-C) to accommodate the continuing addition of new data to the row, each split including a subset of the data row. In some embodiments, the partition of data columns into different splits is based on the relationships between different columns. For example, columns that are often accessed together are put into one split for efficiency. An embedded table within a particular column may be divided into multiple sections with each section belonging to one split as shown in FIG. 1E. As noted above, each split has a split ID for uniquely identifying the split. In some embodiments, the split ID is content-addressable. For example, the split ID may include information about the customer ID associated with the data row 108-1, the metadata associated with the split (e.g., the name of the columns in the split), and the customer data stored within the split. With such content-addressable split ID definition, it is easy for the front-end server to determine: (i) which split (and therefore a corresponding tablet) has the client-requested data based on the information in the client request and (ii) which split (and therefore a corresponding tablet) does not have the client-requested data and can be ignored for the particular client request. As a result, the front-end server only needs to communicate with a tablet server that is responsible for managing the tablet. In some embodiments, the split ID includes a range of string-like keys that correspond to a range of data associated with a customer.

Referring back to FIG. 1D, a tablet 121-1 includes splits corresponding to group 109-1). Similarly, a tablet 121-3 includes splits associated with group 109-3. By including as many splits as possible within a group, the total number of groups (and hence tablets) can be reduced.

As shown in FIG. 1D, a tablet server 125-1 further includes tablet metadata 127-1 associated with tablets (121-1, 121-3) managed by the tablet server. In this example, the tablet metadata 127-1 includes a directory-to-group map 127-3 and group state information 127-5. The directory-to-group map 127-3 locates a particular group within a tablet for a particular directory in the directory map. The group state information 127-5 includes the state information for a particular group replica, such as the log data, view information, the list of group replicas, etc. Given a directory associated with a tablet, the tablet server can scan the directory-to-group map for an entry that has the same directory name. Once an entry is identified, the tablet server can access the corresponding group state information using a group ID within this entry. In some embodiments, the tablet server supports the removal of a range of directories from a tablet by eliminating data associated with each directory within the range from the tablet when removing a directory replica from the tablet.

In some embodiments, one group in the distributed storage system may be split into two or more groups for several reasons. For example, a tablet containing the group is overloaded or too large. In this case, splitting the group may help reduce the load of the tablet if, e.g., this group contributes to a significant fraction of the load or size of the tablet. Sometimes, access patterns for some directories within a group are very different from access patterns for the rest of the group. For example, a group may be split into two if most directories in the group are accessed from US, but a particular set of directories in the group are mostly accessed from Europe.

Figure 1F:
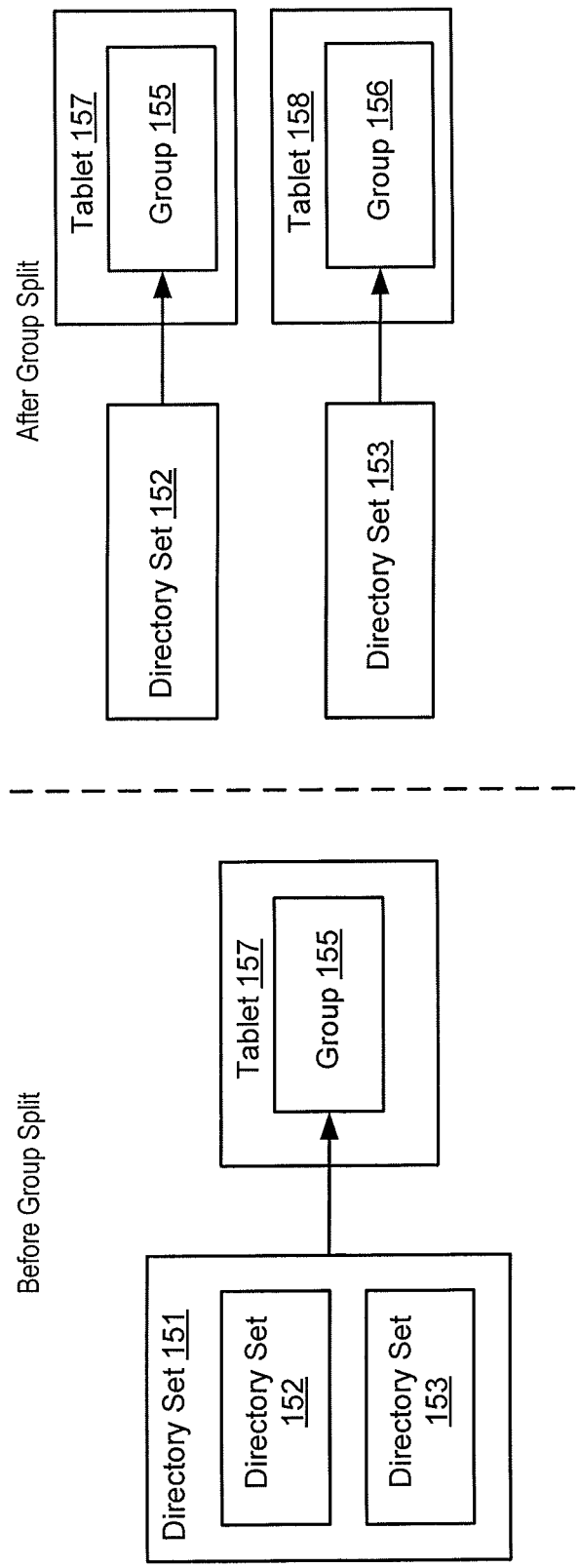

As shown in FIG. 1F, the directory set 151 is associated with the group 155, which is a member of the tablet 157. The directory set 151 includes a directory set 152 and a directory set 153. It is assumed that the directory set 153 will be moved to another group. To do so, a new group, group 156, is created on a tablet 158. After the creation, the group 156 can be changed via the normal replica addition or removal. In this example, the group split is implemented as a single-site transaction on the group 155 and the transaction update is applied at every replica of the group 155. As shown in FIG. 1F, at the completion of the transaction, the directory set 153 is associated with the group 156 and the directory set 152 is associated with the group 155. The metadata associated with the group 156 is populated with the portion of the metadata associated with the group 155 corresponding to the directory set 153 and the metadata associated with the group 155 is updated to indicate that the directory set 156 has been moved to the group 156.

Figure 2A:
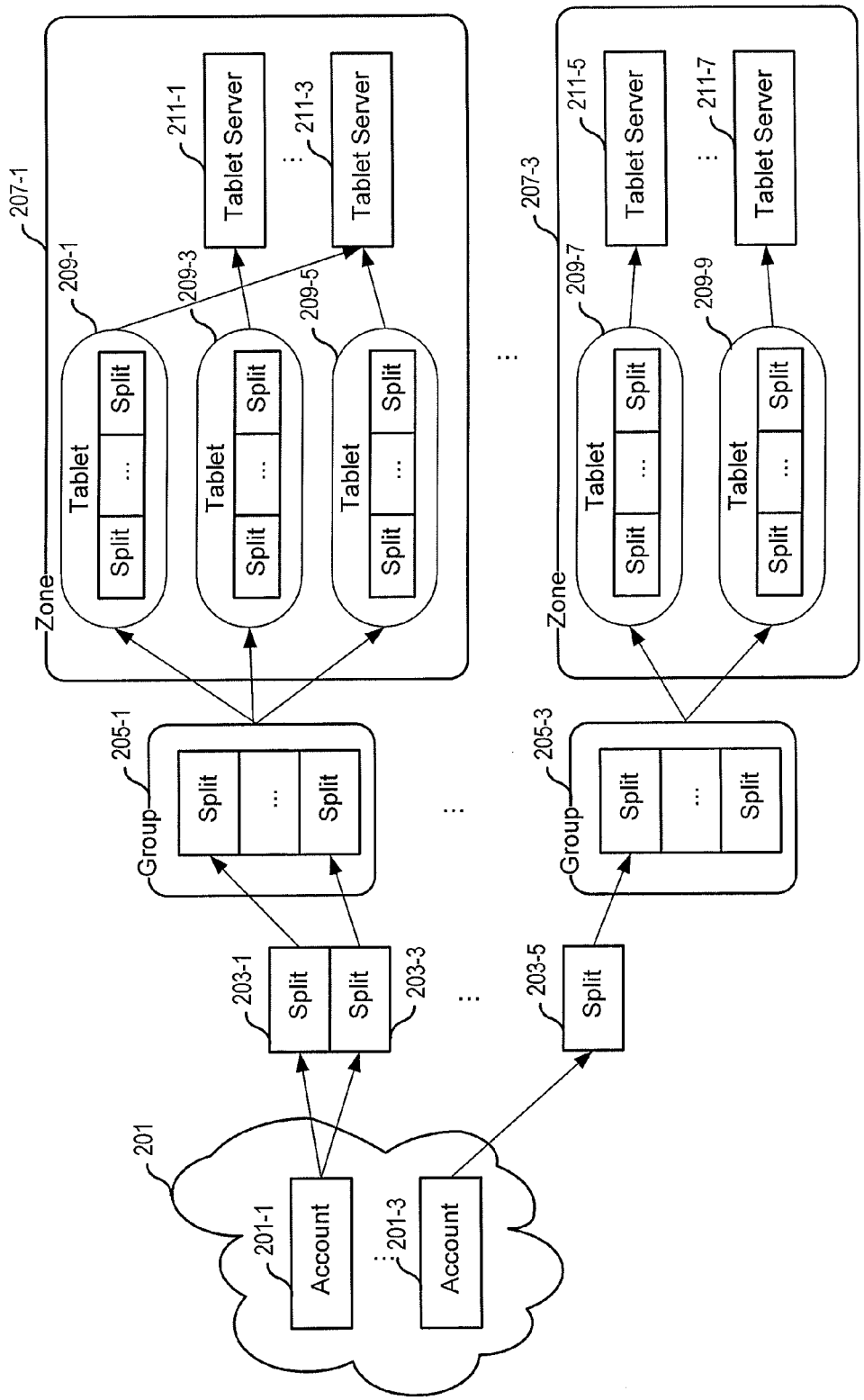
FIGS. 2A and 2B are block diagram and flow chart illustrating how data associated with different accounts is replicated within the distributed storage system in accordance with some embodiments.
Figure 2B:
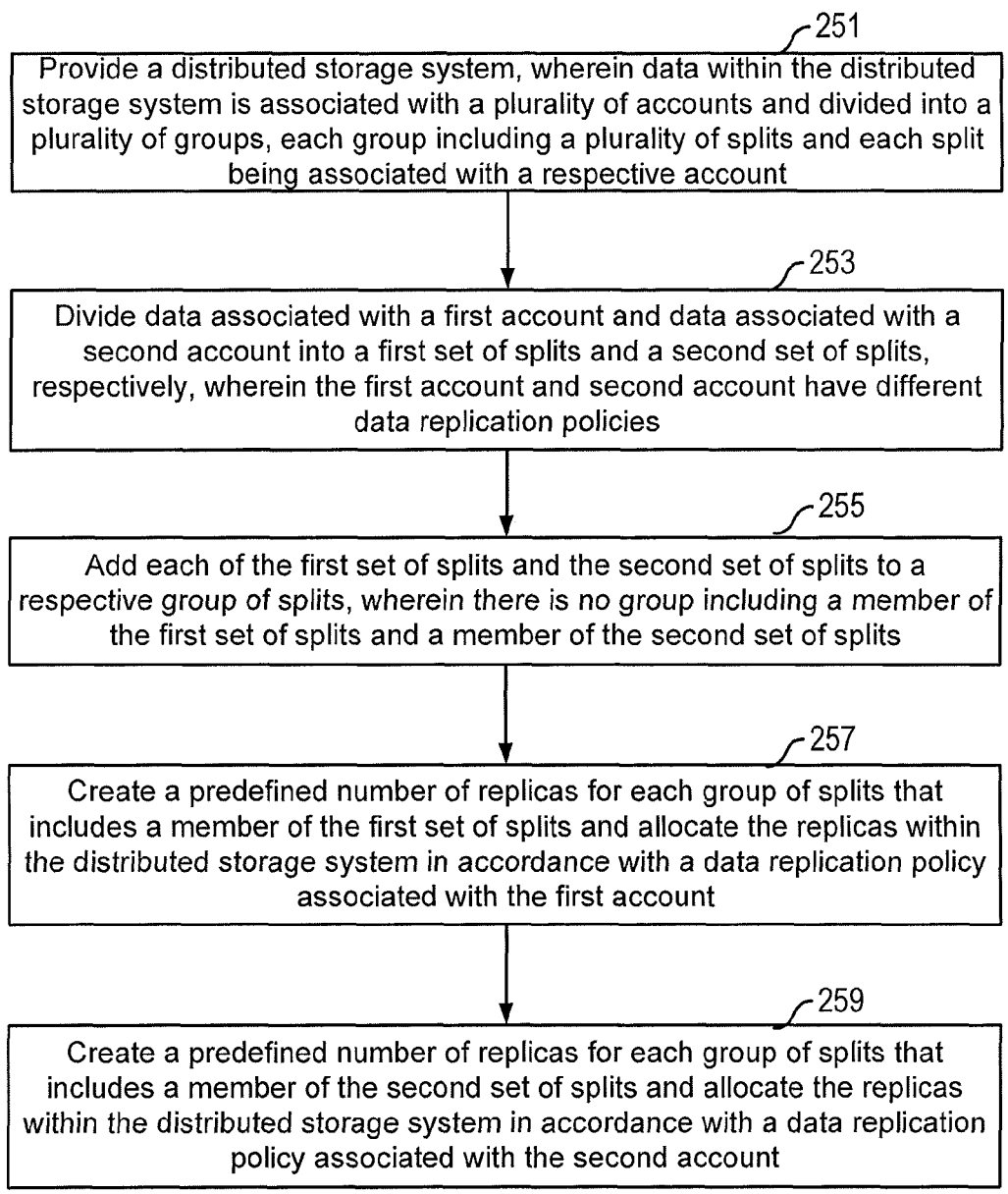

FIGS. 2A and 2B are block diagram and flow chart illustrating how data associated with different accounts is replicated within the distributed storage system in accordance with some embodiments. As shown in FIG. 2B, a distributed storage system is provided (251) for managing the data 201 associated with a plurality of accounts, including dividing the data into a plurality of groups, each group including a plurality of splits and each split being associated with a respective account. In particular, the data associated with a first account (e.g., the account 201-1 in FIG. 2A) is divided (253) into a first set of splits (e.g., the splits 203-1 and 203-3 in FIG. 2A) and the data associated with a second account (e.g., the account 201-3 in FIG. 2A) is divided (253) into a second set of splits (e.g., the split 203-5 in FIG. 2A). The distributed storage system adds (255) each of the first set of splits to a group of splits (e.g., the group 205-1 in FIG. 2A) and adds each of the second set of splits to a group of splits (e.g., the group 205-3 in FIG. 2A). In this example, it is assumed that the first account and second account have different data replication policies. For example, the first account may require that the distributed storage system create three replicas for its data and allocate the three replicas in a zone corresponding to North America and the second account may require that the distributed storage system create two replicas for its data and allocate the two replicas in a zone corresponding to Europe. Since the two accounts have different policies, a member of the first set of splits cannot be added to the group 205-3 that includes a member of the second set of splits. Similarly, a member of the second set of splits cannot be added to the group 205-1 that includes a member of the first set of splits. In other words, there is no group in the distributed storage system that includes both a member of the first set of splits and a member of the second set of splits.

By allowing each account to have its own data replication policy, the distribute storage system offers both flexibility and scalability to different types of online service applications that use the distributed storage system for storing their data. For example, an account that needs frequent access to its data from one or more geographical locations may specify such need in its data replication policy so that the distributed storage system may create more replicas for the data associated with the account at a zone close to the data accessing locations and reduce the latency required for a client to access such data.

As shown in FIG. 2A, the distributed storage system creates (257 in FIG. 2B) a predefined number (e.g., three) of replicas for each group of splits (e.g., the group 205-1) that includes a member of the first set of splits and allocates the three replicas in a zone (e.g., the zone 207-1) in accordance with the data replication policy associated with the first account. In this example, the zone 207-1 includes three tablets (209-1, 209-3, 209-5), each being one replica of the group 205-1, and each tablet includes a copy of the first set of splits associated with the first account 201-1. As described above, each tablet in a zone is assigned to a tablet server for managing data access requests directed to the tablet. In this case, the three tablets are managed by two tablet servers 211-1 and 211-3. In other words, tablets associated with the same group of splits may be managed by the same tablet server or different tablet servers depending on the load balance of the respective tablet servers in a zone. Similarly, the distributed storage system creates (259 in FIG. 2B) a predefined number (e.g., two) of replicas for each group of splits (e.g., the group 205-3) that includes a member of the second set of splits and allocates the replicas in a zone (e.g., the zone 207-3) in accordance with the data replication policy associated with the second account. In this example, the zone 207-3 includes two tablets (209-7, 209-9), each being a replica of the group 205-3, and each tablet includes a copy of the second set of splits associated with the second account 201-3 and is managed by a respective tablet server (211-5 or 211-7). It should be noted that the data replication policy of a group of splits is driven by the data replication policies of the different splits in the group, which are driven by the data replication policies of the accounts associated with the different splits. The distributed storage system is responsible for putting those splits having the same or similar data replication policies into the same group to improve the system's efficiency. In some embodiments, the enforcement of the account-level (or directory-level) data replication policy is determined by the distributed storage system based on the availability of resources at different zones. In other words, it is possible that the distributed storage system may not always store splits associated with a particular account strictly in accordance with the account's data replication policy. For example, the splits may be initially stored in a zone different from a zone defined by the account's data replication policy and then moved to the zone. In this case, the distributed storage system allows an account to specify its desired placement of the splits associated with the account in the directory map and will try to satisfy such requirement whenever it is possible. In some embodiments, an account may change its data replication policy from time to time. For example, an email account user may temporarily move from North America to Europe. When the email application detects such movement, it may notify the distributed storage system to move tablets associated with the email account from a data center in North America to a data center in Europe to provide a better service to the end user.

Figure 3A:
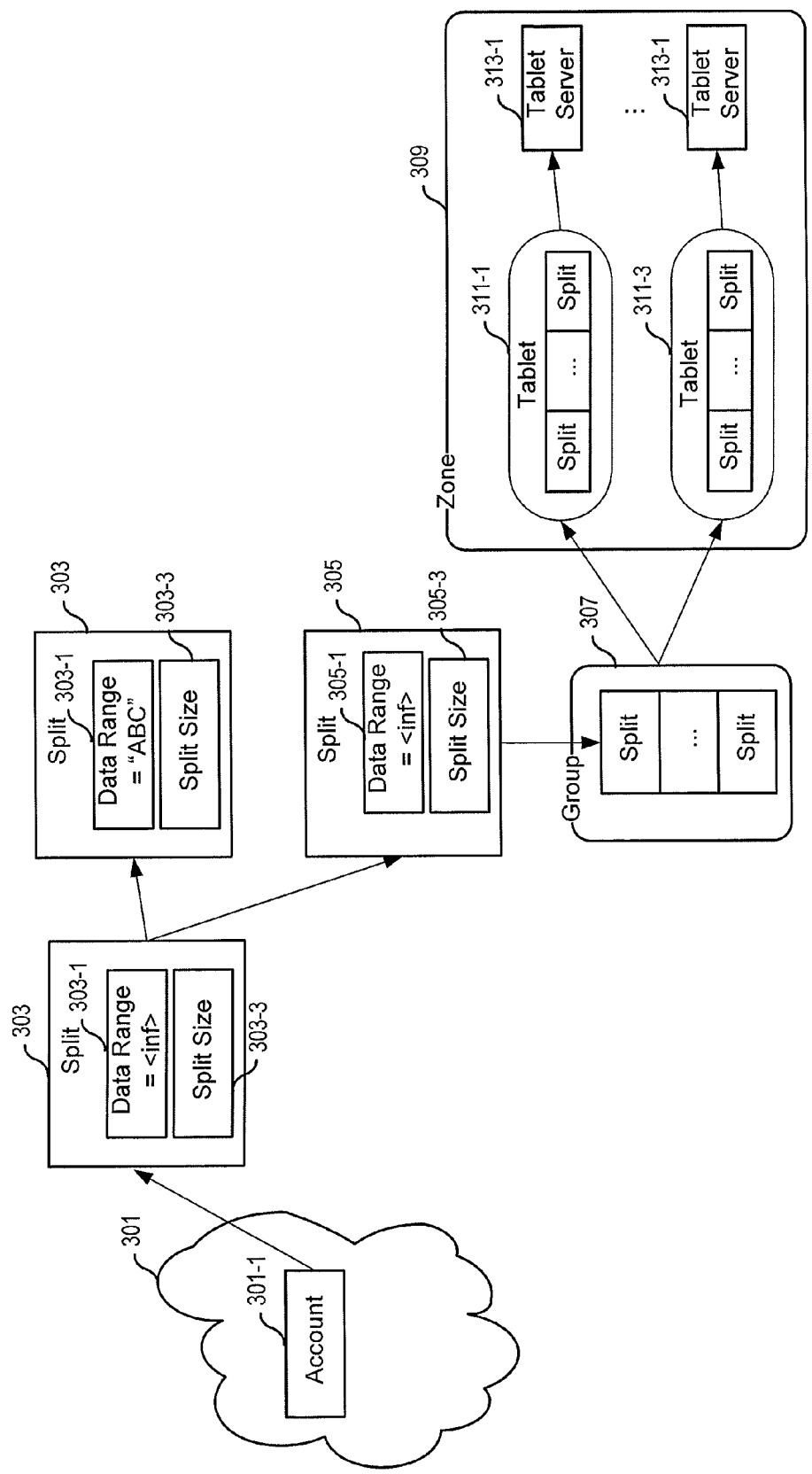
FIGS. 3A and 3B are block diagram and flow chart illustrating how data associated with an account is added within the distributed storage system in accordance with some embodiments.
Figure 3B:
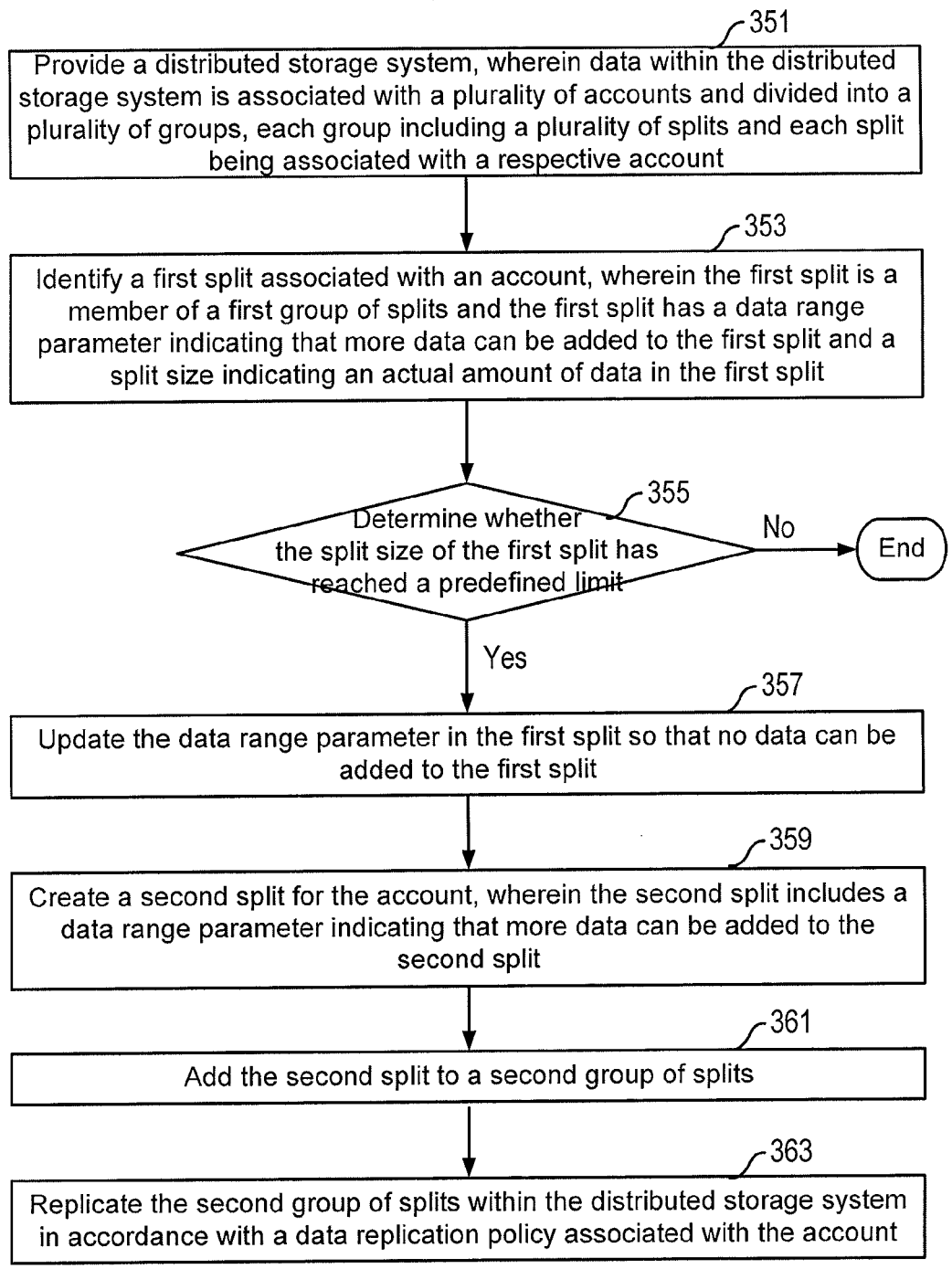

FIGS. 3A and 3B are block diagram and flow chart illustrating how data associated with an account is added within the distributed storage system in accordance with some embodiments. As noted above, the division of an account's data into one or more splits eliminates the data limit for a particular account managed by the distributed storage system because the distributed storage system can add new splits to an account when its existing split runs out of space. As shown in FIG. 3B, a distributed storage system is provided (351) for managing the data 301 associated with a plurality of accounts, including dividing the data into a plurality of groups, each group including a plurality of splits and each split being associated with a respective account. In particular, the data associated with an account (e.g., the account 301-1 in FIG. 3A) initially includes only one (e.g., the split 303 in FIG. 2A). As described above in connection with FIGS. 2A and 2B, this split is added to a group of splits and replicated within a particular zone as part of a set of tablets associated with the group in accordance with the data replication policy. As shown in FIG. 3B, the distributed storage system identifies (353) a first split (e.g., the split 303 in FIG. 3A) associated with the account. In this example, the first split is the split 303 that includes multiple parameters including the data range parameter 303-1 and the split size parameter 303-3. Note that the value <inf> of the data range parameter 303-1 indicates that the split 303 still has space for more data to be added to the split and the split size parameter 303-3 represents the actual amount of data in the split 303.

In some embodiments, each account has only one split whose data range parameter has a value of <inf>. As shown in FIG. 3B, the distributed storage system determines (355) whether the split associated with the account reaches its limit according to a predefined schedule (e.g., periodically). If not (355—no), the distributed storage system stops checking this account and proceeds to check another account. Otherwise (355—yes), the distributed storage system will take further actions by creating a new split for the account.

As shown in FIG. 3A, when the existing split 303 runs out of space, the distributed storage system updates (357) the data range parameter in the split 303 from <inf> to "ABC." Note that the expression "ABC" is an expression that corresponds to the actual upper limit of the data within the split 303. From this parameter, the distributed storage system can tell what data is within each split. In response to a client request for a particular piece of data, the distributed storage system can use the data range parameter to determine which split or splits have the client-requested data. By doing so, the distributed storage system also marks the first split as not accepting any new data. The distributed storage system then creates (359) a second split (e.g., the split 305 in FIG. 3B) for the account. As shown in FIG. 3B, the second split 305 includes a data range parameter 305-1 that has a value of <inf> indicating that more data can be added to the second split and a split size parameter 305-3 that grows as more and more data is added to the second split 305. Moreover, the distributed storage system selects a second group of splits (e.g., the group 307 in FIG. 3A) for the second split 305 and adds (361) the second split to a second group of splits. It should be noted that the second group 307 may be the same group that includes the split 303 or a different one. Finally, the distributed storage system replicates (363) the second group of splits in a particular zone (e.g., the zone 309 in FIG. 3A) in accordance with a data replication policy associated with the account. In this example, the second group 307 has two tablets (311-1, 311-3) in the zone 309, which are managed by two respective tablet servers 313-1 and 313-3. In some embodiments, the creation of a new split for an account may be triggered by the movement of data within the distributed storage system, e.g., in response to a change of the data replication policy. In either case, the creation of new splits for the account ensures that the client can add more data to this account without disrupting the service associated with the account.

Figure 4A:
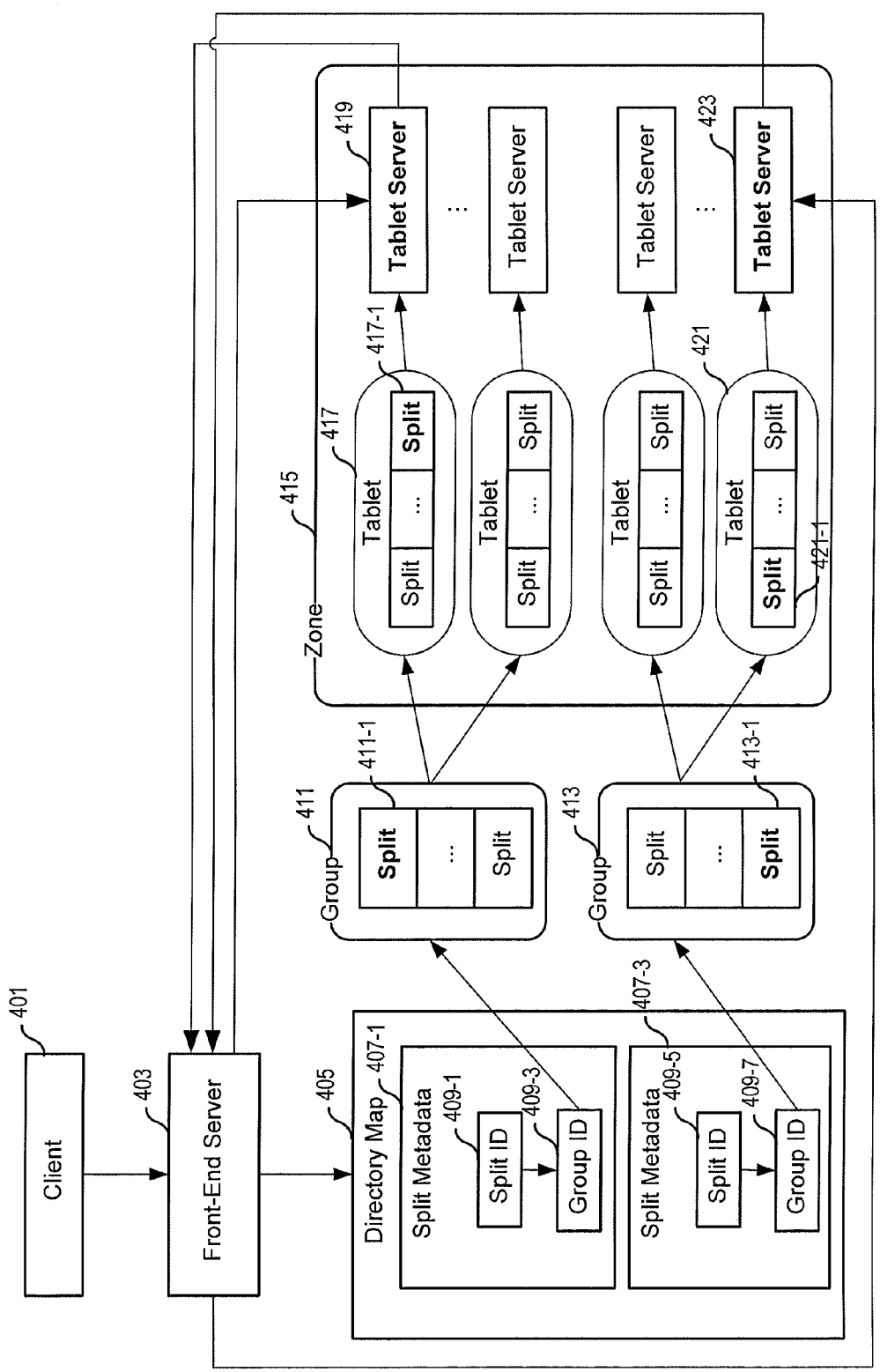
FIGS. 4A and 4B are block diagram and flow chart illustrating how data is located within the distributed storage system in response to a data access request from a client in accordance with some embodiments.
Figure 4B:
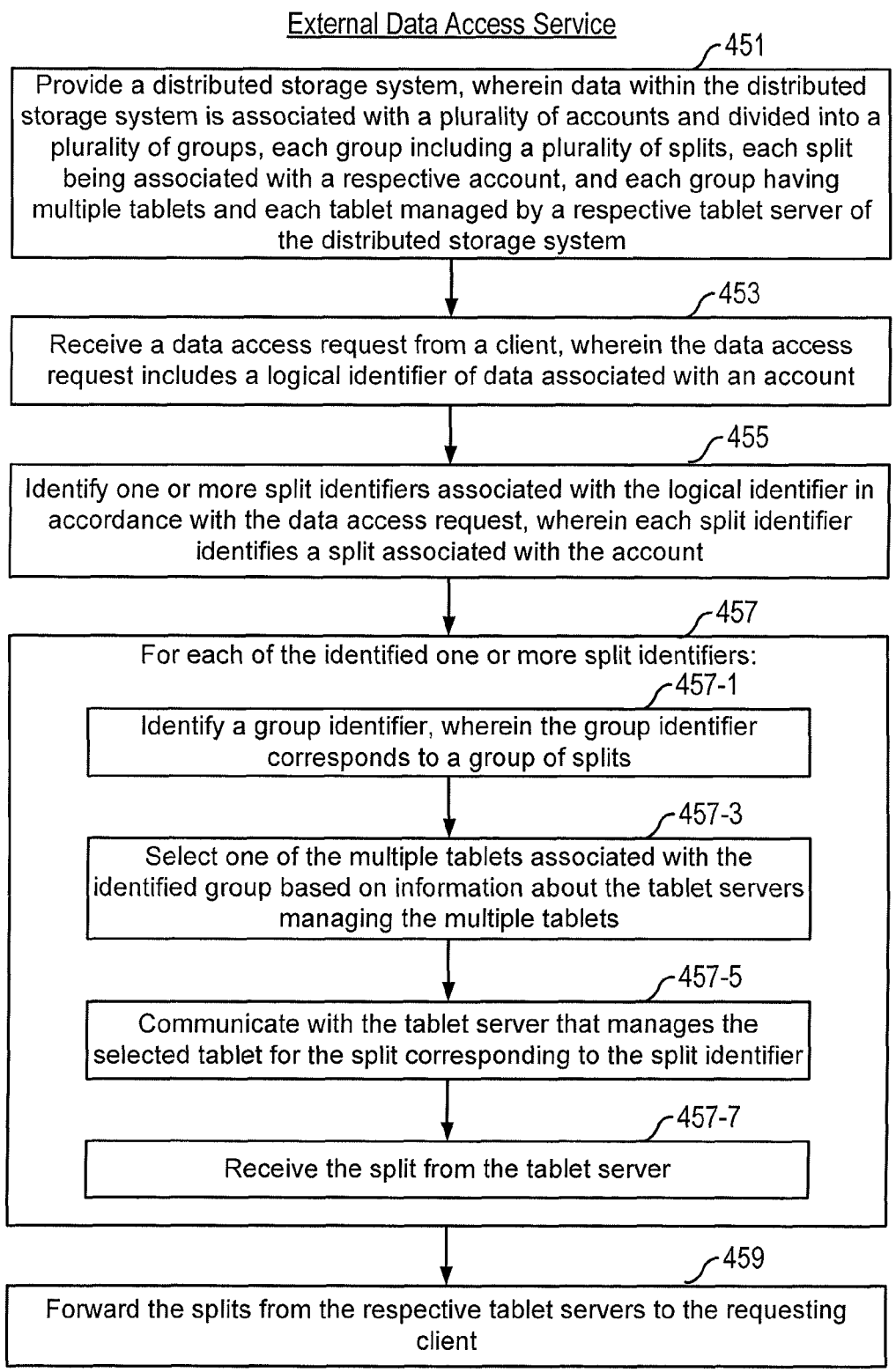

FIGS. 4A and 4B are block diagram and flow chart illustrating how data is located within the distributed storage system in response to a data access request from a client in accordance with some embodiments. As shown in FIG. 4B, a distributed storage system is provided (451) for managing data associated with a plurality of accounts, which is divided into a plurality of groups, each group including a plurality of splits, each split being associated with a respective account, and each group having multiple tablets and each tablet managed by a respective tablet server of the distributed storage system. A front-end server (403 in FIG. 4A) of the distributed storage system receives (453) a data access request from a client (401 in FIG. 4A). In some embodiments, the data access request includes a logical identifier (e.g., a directory identifier) of data associated with an account associated with the client.

In response, the front-end server (403 in FIG. 4A) identifies (455) one or more split identifiers associated with the logical identifier in accordance with the data access request. As shown in FIG. 4A, the front-end server 403 identified two splits within the directory map 405, they are the split 407-1 and the split 407-3. Each split's metadata includes a split ID (409-1, 409-5) that identifies a split associated with the account. For each of the identified one or more split identifiers (457), the front-end server 403 identifies (457-1) a group identifier (e.g., the group IDs 409-3 and 409-7 in FIG. 4A), each group identifier corresponds to a group of splits. In the example shown in FIG. 4A, the group ID 409-3 corresponds to the group 411 of splits that includes a split 411-1 corresponding to the split 407-1 in the directory map 405 and the group ID 409-7 corresponds to the group 413 of splits that includes a split 413-1 corresponding to the split 407-3 in the directory map 405. The distributed storage system selects (457-3) one of the multiple tablets associated with each identified group based on information about the tablet servers managing the multiple tablets. For example, the zone 415 includes two tablets associated with each of the two identified groups 411 and 413. In particular, the tablet 417 is identified for the group 411 and the tablet 417 includes a split 417-1 that corresponds to the split 407-1 in the directory map 405. The tablet 421 is identified for the group 413 and the tablet 421 includes a split 421-1 that corresponds to the split 407-3 in the directory map 405. For each selected tablet, there is a corresponding tablet server in the zone 415 that is responsible for managing data access requests to the tablet. In this example, the tablet server 419 is responsible for managing the tablet 417 and the tablet server 423 is responsible for managing the tablet 421. After identifying each tablet server, the front-end server 403 communicates (457-5) with the tablet server that manages the selected tablet for the split corresponding to the split identifier for the split associated with the client request and receives (457-7) the split from the tablet server. After receiving the splits from different tablet servers, the front-end server forwards (459) the splits from the respective tablet servers to the requesting client in satisfying the client's data access request. It should be noted that the client access request may be a read-only request or a read-and-write request. Since each group of splits includes multiple tablets, any data update to one split within the group should be replicated within each tablet associated with the group.

Figure 5:
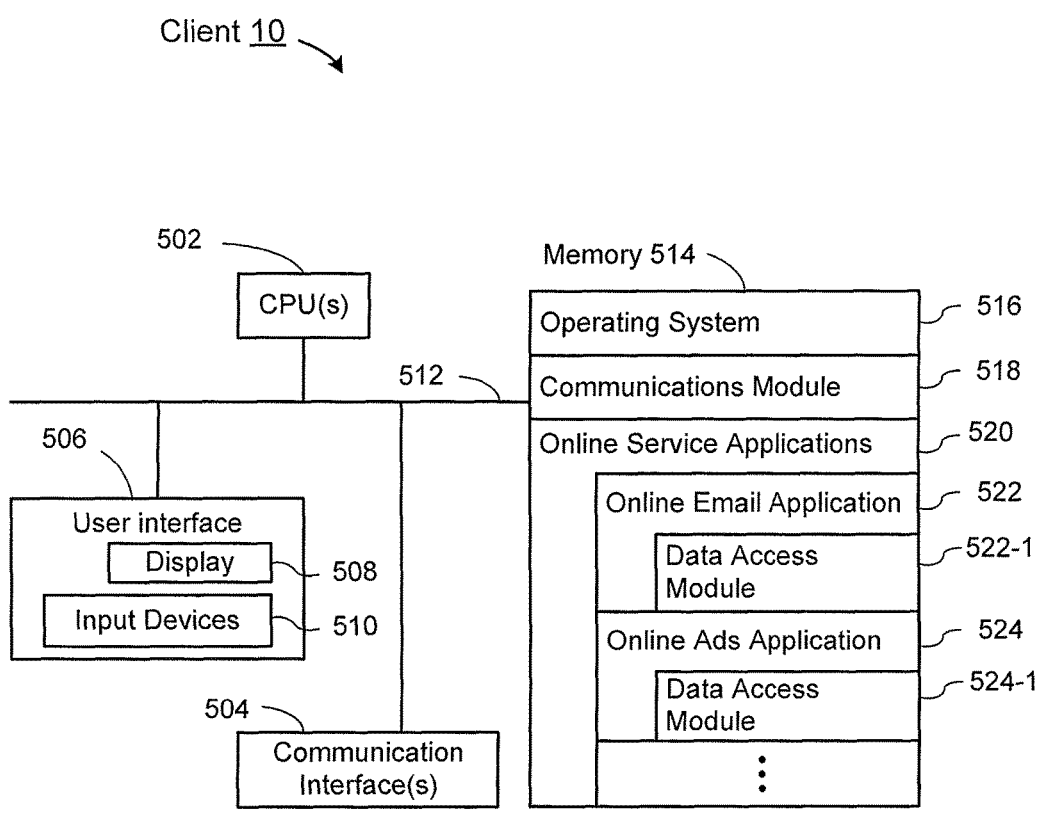
FIG. 5 is a block diagram illustrating the components of the client in accordance with some embodiments.

FIG. 5 is a block diagram illustrating the components of the client in accordance with some embodiments. The client 10 is a computer server that includes one or more processing units (CPU's) 502 for executing modules, programs and/or instructions stored in the memory 514 and thereby performing processing operations; one or more network or other communications interfaces 504; memory 514; and one or more communication buses 512 for interconnecting these components. In some implementations, the client 10 includes a user interface 406 comprising a display device 508 and one or more input devices 510 (e.g., keyboard or mouse or remote control). In some implementations, the memory 514 includes high-speed random access memory, such as DRAM, SRAM, DDR RAM or other random access solid state memory devices. In some implementations, memory 514 includes non-volatile memory, such as one or more magnetic disk storage devices, optical disk storage devices, flash memory devices, or other non-volatile solid state storage devices. In some implementations, memory 514 includes one or more storage devices remotely located from the CPU(s) 502. Memory 514, or alternately the non-volatile memory device(s) within memory 514, comprises a non-transitory computer readable storage medium. In some implementations, memory 514 or the non-transitory computer readable storage medium of memory 514 stores the following elements, or a subset of these elements, and may also include additional elements:

- an operating system 516 that includes procedures for handling various basic system services and for performing hardware dependent tasks;
- a network communications module 518 that is used for coupling the client 10 to the distributed storage system 100 via the communication network interfaces 504 and one or more communication networks (wired or wireless), such as the network 20, other wide area networks, local area networks, metropolitan area networks, and so on; and
- one or more online service applications 520, such as an online email application 522 that includes a data access module 522-1 for communicating with the distributed storage system 100 for exchanging data, an online advertising application 524 that includes a data access module 524-1 for communicating with the distributed storage system 100 for exchanging data, etc.

Figure 6:
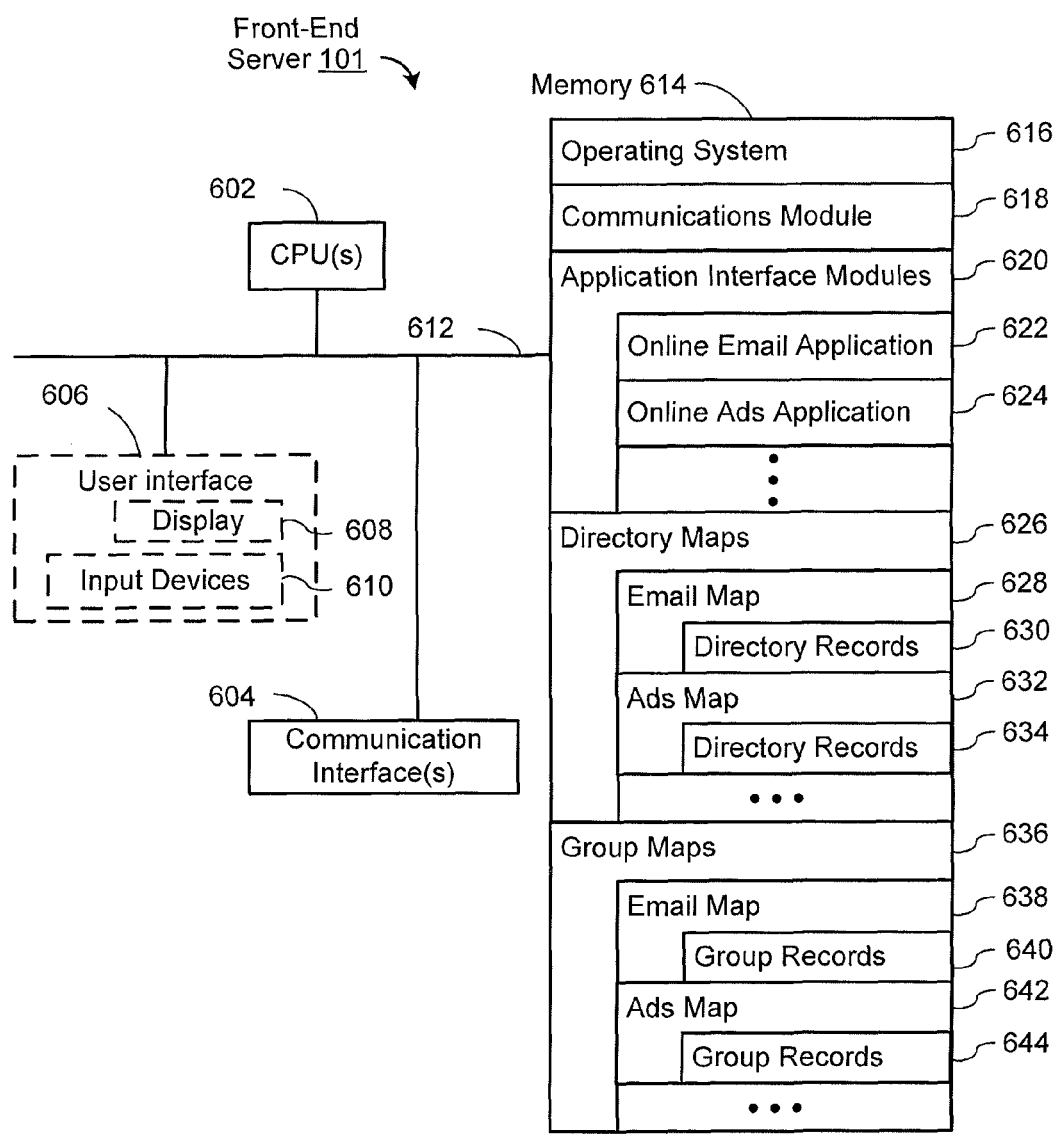
FIG. 6 is a block diagram illustrating the components of a front-end server of the distributed storage system in accordance with some embodiments.

FIG. 6 is a block diagram illustrating the components of a front-end server of the distributed storage system in accordance with some embodiments. The front-end server 101 includes one or more processing units (CPU's) 602 for executing modules, programs and/or instructions stored in the memory 614 and thereby performing processing operations; one or more network or other communications interfaces 604; memory 614; and one or more communication buses 612 for interconnecting these components. In some implementations, the front-end server 101 includes an optional user interface 606 comprising a display device 608 and one or more input devices 610 (e.g., keyboard or mouse or remote control). In some implementations, the memory 614 includes high-speed random access memory, such as DRAM, SRAM, DDR RAM or other random access solid state memory devices. In some implementations, memory 614 includes non-volatile memory, such as one or more magnetic disk storage devices, optical disk storage devices, flash memory devices, or other non-volatile solid state storage devices. In some implementations, memory 614 includes one or more storage devices remotely located from the CPU(s) 602. Memory 614, or alternately the non-volatile memory device(s) within memory 614, comprises a non-transitory computer readable storage medium. In some implementations, memory 614 or the non-transitory computer readable storage medium of memory 614 stores the following elements, or a subset of these elements, and may also include additional elements:

- an operating system 616 that includes procedures for handling various basic system services and for performing hardware dependent tasks;
- a network communications module 618 that is used for connecting the front-send server 101 to other devices (e.g., the clients 10 and the other components in the distributed storage system 100 such as the zones) via the communication network interfaces 604 and one or more communication networks (wired or wireless), such as the network 20, other wide area networks, local area networks, metropolitan area networks, and so on;
- a plurality of application interface modules 620, such as an online email application module 622 for exchanging data with the data access module 522-1 in the client 10, an online advertising application module 624 for exchanging data with the data access module 524-1 in the client 10, etc;
- a plurality of directory maps 626, such as an online email application directory map 628 including a plurality of records 630 defining the relationship between different email accounts with their respective splits in the distributed storage system, an online advertising application directory map 632 including a plurality of records 634 defining the relationship between different advertising customer accounts with their respective splits in the distributed storage system, etc; and
- a plurality of group maps 636, such as an online email application directory map 638 including a plurality of records 640 defining the relationship between different groups with their respective sets of tablets in the distributed storage system, an online advertising application directory map 642 including a plurality of records 644 defining the relationship between different groups with their respective sets of tablets in the distributed storage system, etc.

Figure 7:
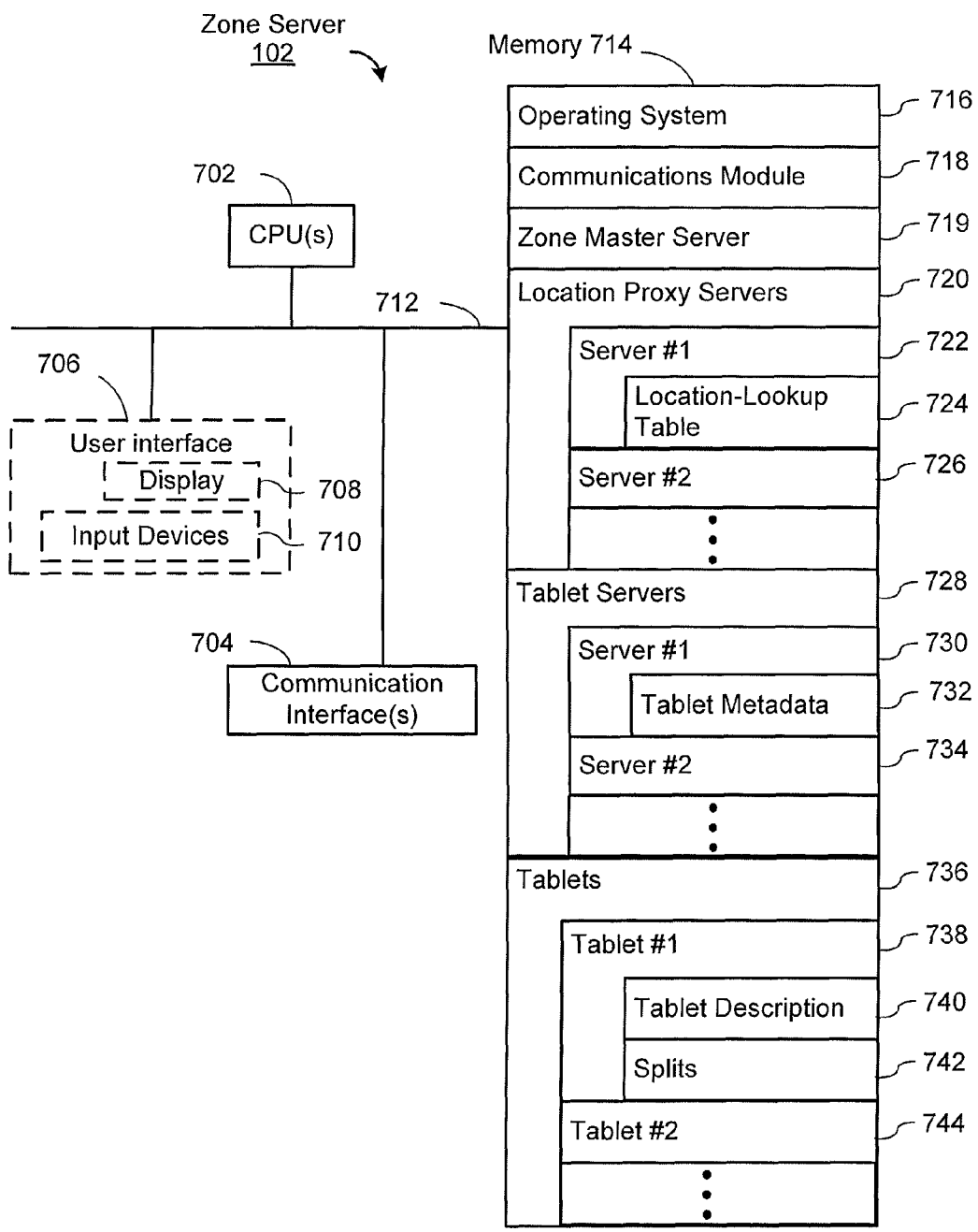
FIG. 7 is a block diagram illustrating the components of a zone of the distributed storage system in accordance with some embodiments.

FIG. 7 is a block diagram illustrating the components of a zone of the distributed storage system in accordance with some embodiments. The zone servers 102 include one or more processing units (CPU's) 702 for executing modules, programs and/or instructions stored in the memory 714 and thereby performing processing operations; one or more network or other communications interfaces 704; memory 714; and one or more communication buses 712 for interconnecting these components. In some implementations, the zone servers 102 includes an optional user interface 706 comprising a display device 708 and one or more input devices 710 (e.g., keyboard or mouse or remote control). In some implementations, the memory 714 includes high-speed random access memory, such as DRAM, SRAM, DDR RAM or other random access solid state memory devices. In some implementations, memory 714 includes non-volatile memory, such as one or more magnetic disk storage devices, optical disk storage devices, flash memory devices, or other non-volatile solid state storage devices. In some implementations, memory 714 includes one or more storage devices remotely located from the CPU(s) 702. Memory 714, or alternately the non-volatile memory device(s) within memory 714, comprises a non-transitory computer readable storage medium. In some implementations, memory 714 or the non-transitory computer readable storage medium of memory 714 stores the following elements, or a subset of these elements, and may also include additional elements:

- an operating system 716 that includes procedures for handling various basic system services and for performing hardware dependent tasks;
- a network communications module 718 that is used for connecting the zone servers 102 to other devices (e.g., the front-end servers 101) via the communication network interfaces 704 and one or more communication networks (wired or wireless), such as the network links 104, other wide area networks, local area networks, metropolitan area networks, and so on;
- a zone master server 719 for managing the location proxy servers 720 and the tablet servers 728 within each zone;
- a plurality of location proxy servers 720, each server (722, 726) further including a location-lookup table 724 for identifying a map between a respective tablet and a respective tablet server;
- a plurality of tablet servers 728, each server (730, 734) further including tablet metadata 732 for managing a plurality of tablets such as the data access requests directed to the tablets; and a plurality of tablets 736, each tablet (738, 744) further including a tablet description 740 and a plurality of splits 742.

Figure 8:
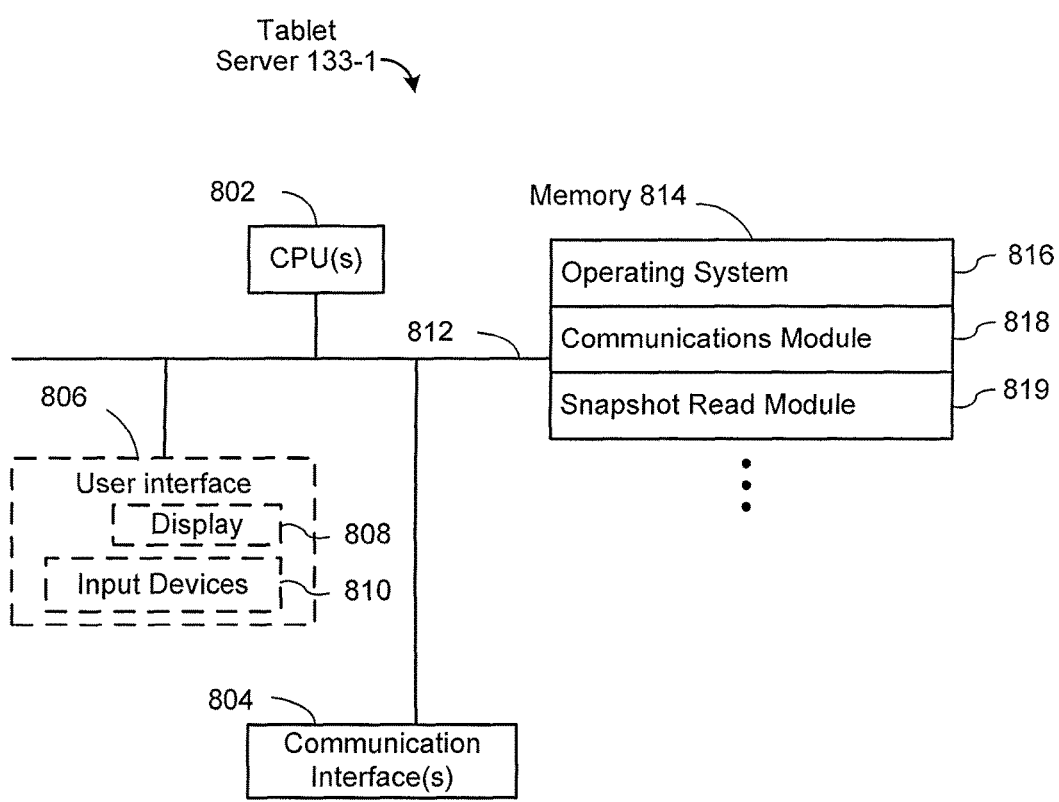
FIG. 8 is a block diagram illustrating the components of a tablet server in accordance with some embodiments.

FIG. 8 is a block diagram illustrating the components of the tablet server 133-1 of the distributed storage system in accordance with some embodiments. Note that the following discussion may apply to any tablet server in the distributed storage system 100. The tablet server 133-1 includes one or more processing units (CPU's) 802 for executing modules, programs and/or instructions stored in the memory 814 and thereby performing processing operations; one or more network or other communications interfaces 804; memory 814; and one or more communication buses 812 for interconnecting these components. In some implementations, the zone servers 102 includes an optional user interface 806 comprising a display device 808 and one or more input devices 810 (e.g., keyboard or mouse or remote control). In some implementations, the memory 814 includes high-speed random access memory, such as DRAM, SRAM, DDR RAM or other random access solid state memory devices. In some implementations, memory 814 includes non-volatile memory, such as one or more magnetic disk storage devices, optical disk storage devices, flash memory devices, or other non-volatile solid state storage devices. In some implementations, memory 814 includes one or more storage devices remotely located from the CPU(s) 802. Memory 814, or alternately the non-volatile memory device(s) within memory 814, comprises a non-transitory computer readable storage medium. In some implementations, memory 814 or the non-transitory computer readable storage medium of memory 814 stores the following elements, or a subset of these elements, and may also include additional elements:
- an operating system 816 that includes procedures for handling various basic system services and for performing hardware dependent tasks;
- a network communications module 818 that is used for connecting the zone servers 102 to other devices (e.g., the front-end servers 101) via the communication network interfaces 804 and one or more communication networks (wired or wireless), such as the network links 104, other wide area networks, local area networks, metropolitan area networks, and so on; and
- a snapshot read module 819 that performs snapshot read operations as described herein.

In some embodiments, the programs or modules identified above correspond to sets of instructions for performing a function described above. The sets of instructions can be executed by one or more processors (e.g., the CPUs 802). The above identified modules or programs (i.e., sets of instructions) need not be implemented as separate software programs, procedures or modules, and thus various subsets of these programs or modules may be combined or otherwise re-arranged in various embodiments. In some embodiments, memory 814 stores a subset of the modules and data structures identified above. Furthermore, memory 814 may store additional modules and data structures not described above.

Although FIG. 8 shows a "tablet server," FIG. 8 is intended more as functional description of the various features which may be present in a set of tablet servers than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement a tablet and how features are allocated among them will vary from one embodiment to another, and may depend in part on the amount of data traffic that the system must handle during peak usage periods as well as during average usage periods.

Efficient Snapshot Read of a Database in a Distributed Storage System

In some embodiments, the distributed storage system 100 provides a mechanism to perform a snapshot read operation of at least a portion of a database in the distributed storage system 100. A snapshot read operation is an operation that obtains a snapshot of the state of the database (or portion thereof) at a snapshot time T. In some embodiments, a data item in the database includes a sequence of versions of the data item where each version of the data item is associated with a timestamp. Thus, when a snapshot read operation is performed on the data item to obtain a version of the data item at the snapshot time T, the most-recent version of the data item that has a timestamp no greater than the snapshot timestamp T is read (or otherwise obtained). Note that the term "data item" is used herein to refer to a row of a database, a portion of a row in the database, a directory (e.g., as described above with reference to FIG. 1D), and/or a split (e.g. as described above with reference to FIGS. 1D-1E).

In some embodiments, the snapshot read operation is performed on the database as a whole (e.g., a whole database scan operation) for a snapshot time T. In these embodiments, the snapshot read operation obtains a most-recent version of each item in the database that has a timestamp no greater than the snapshot timestamp T. One complication to the snapshot read operation is the fact that a data item may move between tablets (e.g., for load balancing, for availability, etc.), as described above. When a data item is moved from a first tablet to a second tablet, all versions of the data item are copied from the first tablet to the second tablet. Once the move operation is complete, future versions of the data item are stored only to the second tablet. The data item (including all versions of the data item) are deleted asynchronously on the first tablet. Thus, when a snapshot read operation is performed on each tablet, items that have moved to another tablet since the snapshot timestamp T are detected and the snapshot read operation for these items are directed to the tablets including the items.

In some embodiments, a state of a data item on a tablet is stored in a data structure that includes one or more of: a creation timestamp corresponding to a time when the data item was created on the tablet, a deletion timestamp corresponding to a time when the data item was deleted from the tablet, a move-in timestamp corresponding to a time when the data item was moved into the tablet, and a move-out timestamp corresponding to a time when the data item was moved out of the tablet. A value of infinity may be used to indicate that particular parameter does not have a timestamp associated with it. For example, a value of infinity for the deletion timestamp means that the data item has not been deleted from the tablet. Similarly, a value of infinity for the move-out timestamp means that the data item has not been moved out of the tablet.

Figure 9:
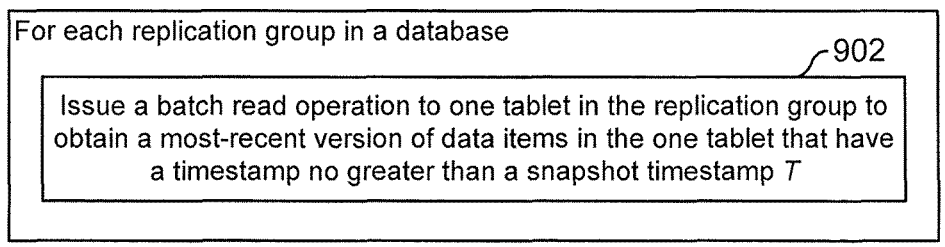
FIG. 9 is a flowchart illustrating a method for performing a whole database snapshot read in accordance with some embodiments.

FIG. 9 is a flowchart illustrating a method for performing a whole database snapshot read in accordance with some embodiments. For each replication group in a database, the distributed storage system 100 issues (902) a batch read operation to one tablet in the replication group to obtain a most-recent version of data items in the tablet that have a timestamp no greater than a snapshot timestamp T. In doing so, the cost of performing a whole-database scan changes from O(Number items in the database) to O(Number of tablets), which is typically an order of millions smaller. Note that since the tablets in a replication group include copies of the same data, the batch read operation only needs to be sent to one tablet in the replication group. However, in embodiments of the distributed storage system 100 that do not replicate data for redundancy and/or availability (e.g., if the distributed storage system 100 does not implement groups and group map functionality described with reference to FIG. 1D), each tablet includes a unique set of data. In other words, in these embodiments, there is no tablet that includes an exact copy of the set of data included in another tablet. Thus, in these embodiments, FIG. 9 is modified as follows. For each tablet in a database, the distributed storage system 100 issues a batch read operation to the tablet to obtain a most-recent version of data items in the tablet that have a timestamp no greater than a snapshot timestamp T.

Figure 10:
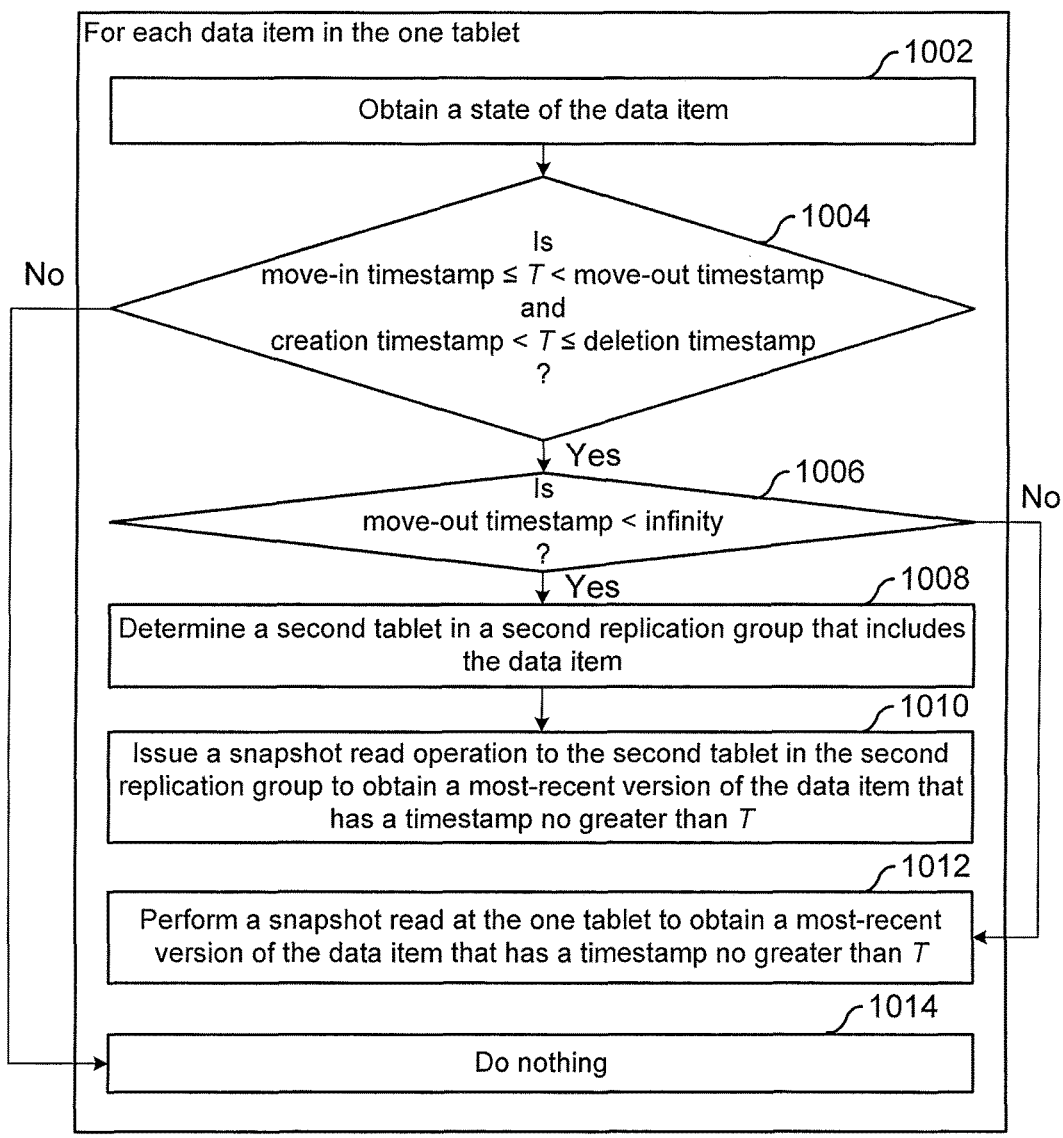
FIG. 10 is a flowchart illustrating a method for performing a batch read operation at a tablet in accordance with some embodiments.

FIG. 10 is a flowchart illustrating a method for performing a batch read operation at a tablet in accordance with some embodiments. For each data item in the one tablet, the snapshot read module 819 performs the following operations. The snapshot read module 819 obtains (1002) a state of the data item. The snapshot read module 819 determines, from the state of the data item, whether (1) the snapshot timestamp T is greater than or equal to the move-in timestamp for the data item and the snapshot timestamp T is less than the move-out timestamp for the data item AND (2) the snapshot timestamp T is greater than the creation timestamp for the data item and the snapshot timestamp T is less than or equal to the deletion timestamp for the data item. When the snapshot timestamp T satisfies both conditions (1004, yes), the snapshot read module 819 determines, from the state of the data item, whether the move-out timestamp for the data item is less than infinity (or another value that indicates that the data item has been moved out of the one tablet).

When the move-out timestamp for the data item is less than infinity (1006, yes), the snapshot read module 819 determines (1008) a second tablet in a second replication group that includes the data item and issues (1010) a snapshot read operation to the second tablet in the second replication group to obtain a most-recent version of the data item that has a timestamp no greater than T. In other words, when the data item has been moved out of the one tablet, the snapshot read module 819 cannot obtain the data item from the one tablet. Accordingly, the snapshot read module 819 has to issue the snapshot read operation to the tablet that now includes the data item. Note that after the data item was moved out of the one tablet, the data item may subsequently be split between two or more tablets. For example, if the data item is a directory, the data in the splits may be partitioned and stored across multiple tablets. Thus, in some embodiments, operations 1008 and 1010 are modified as follows. The snapshot read module 819 determines two or more tablets, each of which is in a separate and distinct replication group, that include the data item and issues snapshot read operations to the two or more tablets to obtain a most-recent version of the data item that has a timestamp no greater than T.

When the move-out timestamp for the data item is infinity (or greater than or equal to some value that indicates that the data item has not been moved out of the tablet) (1006, no), the snapshot read module 819 performs (1012) a snapshot read at the one tablet to obtain a most-recent version of the data item that has a timestamp no greater than T. In other words, since the data item has not been moved out of the one tablet, the snapshot read module 819 obtains the data item from the one tablet.

After obtaining the version of the data item that has a timestamp no greater than T, the snapshot read module 819 provides the version of the data item to a requesting computer system (e.g., the client 10-1, the front-end server 101-1, etc.).

When the snapshot timestamp T does not satisfy the conditions in operation 1004 (1004, no), the snapshot read module 819 does (1014) nothing. In this case, if the data item exists in the distributed storage system 100 at the snapshot timestamp T, another tablet would have the data item and that tablet would read the data item.

The snapshot read operation may be performed on a single item (e.g., row of the database), on multiple items, on all or a portion of the items in a tablet (or multiple tablets), and/or on all or a portion of the items in the database.

In some embodiments, the snapshot read operation reads a portion of the database. In some embodiments, the snapshot read operation includes parameters that specify the subset of the database to be read. For example, the snapshot read operation may include a regular expression used to filter data items or a range of identifiers for data items that are to be read. In some embodiments, a data item is assigned to a tablet based on a type of the data item. For example, tablets T1, T2, T3 may only store data items that have a first type and tablets T4, T5, T6 may only store data items that have a second type. Thus, a snapshot read operation may be performed based on the type of the data item. For example, operation 902 in FIG. 9 is modified as follows to perform a snapshot read operation for data items having a first type. For each tablet of a database, the distributed storage system 100 determines whether the tablet stores data items of the first type. When the tablet stores the data items of the first type, the distributed storage system 100 issues (902) a batch read operation to the tablet to obtain a most-recent version of data items in the tablet that have a timestamp no greater than a snapshot timestamp T. Otherwise, the distributed storage system 100 ignores (e.g., does not issue the batch read operation) to the tablet. Note that the type of data items stored in a tablet may be stored in the tablet's metadata.

As discussed above, data items may be moved from a first tablet to a second tablet. When a data item is moved from the first tablet to the second tablet, the versions of the data item in the first tablet may not be deleted immediately (e.g., the versions of the data item may be deleted in a background garbage-collection or compaction process). To avoid the expensive operations of issuing snapshot read operations to the second tablet (e.g., operations 1008, and 1010 in FIG. 10), in some embodiments, the snapshot read module 819 performs snapshot read operation at the first tablet if the move-out timestamp for the data item is greater than or equal to a compaction timestamp corresponding to the most-recent data item that was deleted from the tablet. Otherwise, the snapshot read module 819 issues a snapshot read operation to the second tablet to obtain a most-recent version of the data item that has a timestamp no greater than T. In other words, if the move-out timestamp of the data item is greater than or equal to the timestamp for the most-recent data item that was deleted, that means the data item has not been deleted from the first tablet yet and therefore, the snapshot read operation of the data item may be performed on the first tablet. In doing so, the expensive operations of issuing snapshot read operations to the second tablet can be avoided even though the data item was moved to the second tablet. If the move-out timestamp of the data item is less than the timestamp for the most-recent data item that was deleted, that means the data item may have been deleted (depending on the compaction schedule) and therefore, the snapshot read operation should be performed on the second tablet.

The methods illustrated in FIGS. 2B, 3B, 4B, and 9-10 may be governed by instructions that are stored in a computer readable storage medium and that are executed by at least one processor of at least one server. Each of the operations shown in FIGS. 2B, 3B, 4B, and 9-10 may correspond to instructions stored in a non-transitory computer memory or computer readable storage medium. In various embodiments, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the embodiment(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determi-nation" or "upon detecting" or "in response to detecting" that the stated condition precedent is true, depending on the context.

The foregoing description included example systems, methods, techniques, instruction sequences, and computing machine program products that embody illustrative embodiments. For purposes of explanation, numerous specific details were set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings. The embodiments were chosen and described in order to best explain the principles and their practical applications, to thereby enable others skilled in the art to best utilize the embodiments and various embodiments with various modifications as are suited to the particular use contemplated.

What is claimed is:

1. A method for performing a batch snapshot read operation in a distributed database having a plurality of storage clusters, the method comprising:
   at a first storage cluster having a plurality of processors and memory storing programs configured for execution by the processors:
   storing a plurality of data items in the distributed database, wherein each data item comprises a respective sequence of timestamped versions, and the data items are partitioned into a plurality of tablets, each tablet storing a respective plurality of the data items;
   receiving a request from a remote computer system to read each of the data items in a first tablet, wherein the request specifies a snapshot timestamp T;
   in response to the request, issuing a batch read operation for metadata corresponding to the data items in the first tablet, wherein respective metadata for each data item includes:
   a respective creation timestamp $T_C$ and a respective deletion timestamp $T_D$, which identify when the respective data item was created and deleted within the distributed database; and
   a respective move-in timestamp $T_{MI}$, and a respective move-out timestamp $T_{MO}$, which identify a span of time when the respective data item was stored in the first tablet, wherein the respective timestamp $T_{MO}$ stores an infinite value indicator when the respective data item is still stored in the first tablet;
   for each of the data items in the first tablet:
   comparing the respective metadata of the respective data item to the snapshot timestamp T;
   issuing a read operation to the first tablet for a most recent version of the respective data item having timestamp no greater than T when:
   (i) the snapshot timestamp T falls within an interval defined by the move-in timestamp $T_{MI}$, and move-out timestamp $T_{MO}$;
   (ii) the snapshot timestamp T falls within an interval defined by the creation timestamp $T_C$ and deletion timestamp $T_D$; and (iii) the move-out timestamp $T_{MO}$ is the infinite value indicator; and issuing a read operation to a respective second tablet at a respective second storage cluster to obtain the most recent version of the respective data item having timestamp no greater than T when (i) the snapshot timestamp T falls within an interval defined by the creation timestamp $T_C$ and deletion timestamp $T_D$ and (ii) the move-out timestamp $T_{MO}$ is not the infinite value indicator; and providing the read versions of the respective data items to the remote computer system.

2. The method of claim 1, wherein the respective metadata for each data item further includes a compaction timestamp, the method further comprising issuing the read operation to the first tablet when the respective compaction timestamp is less than the respective move-out timestamp $T_{MO}$.

3. The method of claim 1, wherein the respective metadata for each data item further includes a compaction timestamp, the method further comprising issuing the read operation to the respective second tablet when the respective compaction timestamp is greater than or equal to the respective move-out timestamp $T_{MO}$.

4. The method of claim 1, further comprising issuing a read operation to a respective third tablet when portions of the respective data item are stored in each of the respective second and third tablets.

5. The method of claim 4, wherein the respective data item is a directory.

6. The method of claim 1, wherein a respective deletion timestamp $T_D$ stores the infinite value indicator when the respective data item has not been deleted from the distributed database.

7. A computer system at a first storage cluster for a distributed database having a plurality of storage clusters, comprising:

a plurality of hardware processors; and one or more memory devices storing one or more programs configured for execution by the processors, the one or more programs including instructions for:

storing a plurality of data items in the distributed database, wherein each data item comprises a respective sequence of timestamped versions, and the data items are partitioned into a plurality of tablets, each tablet storing a respective plurality of the data items;

receiving a request from a remote computer system to read each of the data items in a first tablet, wherein the request specifies a snapshot timestamp T;

in response to the request, issuing a batch read operation for metadata corresponding to the data items in the first tablet, wherein respective metadata for each data item includes:

a respective creation timestamp $T_C$ and a respective deletion timestamp $T_D$, which identify when the respective data item was created and deleted within the distributed database; and a respective move-in timestamp $T_{MI}$ and a respective move-out timestamp $T_{MO}$, which identify a span of time when the respective data item was stored in the first tablet, wherein the respective timestamp $T_{MO}$ stores an infinite value indicator when the respective data item is still stored in the first tablet;

for each of the data items in the first tablet:

comparing the respective metadata of the respective data item to the snapshot timestamp T;

issuing a read operation to the first tablet for a most recent version of the respective data item having timestamp no greater than T when:

(i) the snapshot timestamp T falls within an interval defined by the move-in timestamp $T_{MI}$ and move-out timestamp $T_{MO}$;

(ii) the snapshot timestamp T falls within an interval defined by the creation timestamp $T_C$ and deletion timestamp $T_D$; and (iii) the move-out timestamp $T_{MO}$ is the infinite value indicator; and issuing a read operation to a respective second tablet at a respective second storage cluster to obtain the most recent version of the respective data item having timestamp no greater than T when (i) the snapshot timestamp T falls within an interval defined by the creation timestamp $T_C$ and deletion timestamp $T_D$ and (ii) the move-out timestamp $T_{MO}$ is not the infinite value indicator; and providing the read versions of the respective data items to the remote computer system.

8. The computer system of claim 7, wherein the respective metadata for each data item further includes a compaction timestamp, the one or more programs further comprising instructions for issuing the read operation to the first tablet when the respective compaction timestamp is less than the respective move-out timestamp $T_{MO}$.

9. The computer system of claim 7, wherein the respective metadata for each data item further includes a compaction timestamp, the one or more programs further comprising instructions for issuing the read operation to the respective second tablet when the respective compaction timestamp is greater than or equal to the respective move-out timestamp $T_{MO}$.

10. The computer system of claim 7, wherein the programs further include instructions for issuing a read operation to a respective third tablet when portions of the respective data item are stored in each of the respective second and third tablets.

11. The computer system of claim 10, wherein the respective data item is a directory.

12. The computer system of claim 7, wherein a respective deletion timestamp $T_D$ stores the infinite value indicator when the respective data item has not been deleted from the distributed database.

13. A non-transitory computer readable medium storing one or more programs configured for execution by one or more processors of a computer system at a first storage cluster, the one or more programs including instructions for:

storing a plurality of data items in the distributed database, wherein each data item comprises a respective sequence of timestamped versions, and the data items are partitioned into a plurality of tablets, each tablet storing a respective plurality of the data items;

receiving a request from a remote computer system to read each of the data items in a first tablet, wherein the request specifies a snapshot timestamp T;

in response to the request, issuing a batch read operation for metadata corresponding to the data items in the first tablet, wherein respective metadata for each data item includes:

a respective creation timestamp $T_C$ and a respective deletion timestamp $T_D$, which identify when the respective data item was created and deleted within the distributed database; and a respective move-in timestamp $T_{MI}$ and a respective move-out timestamp $T_{MO}$, which identify a span of time when the respective data item was stored in the first tablet, wherein the respective timestamp $T_{MO}$ stores an infinite value indicator when the respective data item is still stored in the first tablet;

for each of the data items in the first tablet:
comparing the respective metadata of the respective data item to the snapshot timestamp T;
issuing a read operation to the first tablet for a most recent version of the respective data item having timestamp no greater than T when:
(i) the snapshot timestamp T falls within an interval defined by the move-in timestamp $T_{MI}$, and move-out timestamp $T_{MO}$;
(ii) the snapshot timestamp T falls within an interval defined by the creation timestamp $T_C$ and deletion timestamp $T_D$; and
(iii) the move-out timestamp $T_{MO}$ is the infinite value indicator; and
issuing a read operation to a respective second tablet at a respective second storage cluster to obtain the most recent version of the respective data item having timestamp no greater than T when (i) the snapshot timestamp T falls within an interval defined by the creation timestamp $T_C$ and deletion timestamp $T_D$ and (ii) the move-out timestamp $T_{MO}$ is not the infinite value indicator; and
providing the read versions of the respective data items to the remote computer system.

14. The non-transitory computer readable medium of claim 13, wherein the respective metadata for each data item further includes a compaction timestamp, the one or more programs further comprising instructions for issuing the read operation to the first tablet when the respective compaction timestamp is less than the respective move-out timestamp $T_{MO}$.

15. The non-transitory computer readable medium of claim 13, wherein the respective metadata for each data item further includes a compaction timestamp, the one or more programs further comprising instructions for issuing the read operation to the respective second tablet when the respective compaction timestamp is greater than or equal to the respective move-out timestamp $T_{MO}$.

16. The non-transitory computer readable medium of claim 13, wherein the programs further include instructions for issuing a read operation to a respective third tablet when portions of the respective data item are stored in each of the respective second and third tablets.

17. The non-transitory computer readable medium of claim 16, wherein the respective data item is a directory.

18. The non-transitory computer readable storage medium of claim 7, wherein a respective deletion timestamp $T_D$ stores the infinite value indicator when the respective data item has not been deleted from the distributed database.

* * * * *